(12) United States Patent
Nishimura et al.

(10) Patent No.: US 6,560,960 B2
(45) Date of Patent: May 13, 2003

(54) FUEL CONTROL APPARATUS FOR AN ENGINE

(75) Inventors: Hirofumi Nishimura, Hiroshima (JP); Keiji Araki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/963,478

(22) Filed: Sep. 27, 2001

(65) Prior Publication Data

US 2002/0038543 A1 Apr. 4, 2002

(30) Foreign Application Priority Data

Sep. 29, 2000 (JP) ........................................ 2000-297987

(51) Int. Cl.[7] ................................................. F01N 3/00
(52) U.S. Cl. ........................... 60/284; 60/285; 123/399; 123/493
(58) Field of Search ......................... 60/274, 284, 285, 60/300; 123/399, 295, 493

(56) References Cited

U.S. PATENT DOCUMENTS

| 5,402,641 | A | * | 4/1995 | Katoh et al. .................... 60/285 |
| 5,423,181 | A | * | 6/1995 | Katoh et al. .................... 60/285 |
| 5,606,855 | A | * | 3/1997 | Tomisawa ........................ 60/274 |
| 5,784,880 | A | * | 7/1998 | Toshiro et al. .................. 60/285 |
| 5,839,275 | A | * | 11/1998 | Hirota et al. ................... 60/285 |
| 5,902,210 | A | * | 5/1999 | Kobayashi et al. ............ 123/399 |
| 5,941,211 | A | * | 8/1999 | Brehob et al. .................. 60/274 |
| 6,021,638 | A | * | 2/2000 | Hochmuth ....................... 60/285 |
| 6,148,611 | A | * | 11/2000 | Sato ................................ 60/274 |
| 6,389,807 | B1 | * | 5/2002 | Suzuki et al. .................. 60/285 |

FOREIGN PATENT DOCUMENTS

JP           11-229856      8/1999

\* cited by examiner

*Primary Examiner*—Thomas Denion
*Assistant Examiner*—Tu M. Nguyen
(74) *Attorney, Agent, or Firm*—Nixon Peabody LLP; Donald R. Studebaker

(57) ABSTRACT

In the case that an engine is operated in a state where an in-cylinder air/fuel ratio is lean in a stratified combustion region and a fuel cut control is performed under a predetermined condition, when catalysts are in a low temperature state where a purification performance is deteriorated or when a NOx absorptive amount of the lean NOx catalyst, a control procedure for exhaust air/fuel state at a recovery timing from the fuel cut control so that a driving sensation is improved while maintaining the exhaust purification performance by the catalysts. When the fuel cut control is terminated and the engine shifts into the stratified combustion region, if a catalyst temperature is at or below a set temperature or a NOx absorptive amount is at or above a set amount, the in-cylinder air/fuel ratio of the engine is correctively enriched and the exhaust air/fuel state is enriched.

4 Claims, 10 Drawing Sheets

FUEL CONTROL APPARATUS FOR AN ENGINE

BACKGROUND OF THE INVENTION

1. Field of the Invention

This invention relates to an engine fuel control apparatus equipped with an exhaust purification catalyst which controls an average air/fuel ratio prior to an ignition in an in-cylinder combustion chamber to be leaner than a stoichiometric air/fuel ratio in a predetermined region of low rotational speed and low load side and performs a fuel cut control under a predetermined condition.

2. Description of Related Arts

Conventionally, this kind of engine fuel control apparatus is known and is provided with a fuel injector so as to face an in-cylinder combustion chamber of the engine, causes the fuel injector to inject fuel mainly during a cylinder compression stroke to generate a stratified combustion state when the engine is in a predetermined region of low rotational speed and low load side and causes the fuel injector to inject fuel mainly during a cylinder intake stroke in a region of high rotational speed or high load side, as disclosed in Japanese publication of patent application no. 11-229856.

In the aforementioned stratified combustion state, since a mixture combusts in a state where the mixture is unevenly distributed in a proximity of a spark plug, an average air fuel ratio prior to an ignition in an in-cylinder combustion chamber, hereinafter referred to as the in-cylinder air/fuel ratio, can be set at an extremely lean state such as A/F= 30–140, thereby fuel consumption rate can be substantially improved by reducing pumping loss or heat loss compared with a homogeneous combustion state.

Then, when the in-cylinder air/fuel ratio is in the extremely lean state as described above, an exhaust air/fuel state is in a lean state as well. In other words, generally, if the in-cylinder air/fuel ratio is the substantially stoichiometric air/fuel ratio, oxygen concentration remaining in the exhaust gas will become less than about 0.5% and an exhaust air/fuel state at this time will become a state corresponding to the substantially stoichiometric air/fuel ratio. On the other hand, if the in-cylinder air/fuel ratio becomes lean, the exhaust air/fuel state becomes lean, i.e. a higher oxygen concentration state. But, it is very difficult to efficiently reduce NOx in this higher oxygen concentration state.

Hence, in the aforementioned prior art, NOx catalyst is provided including NOx absorbent which absorbs NOx in an excess oxygen atmosphere and releases NOx when the oxygen concentration decreases, and in the proximity of this a three-way catalyst is disposed, wherein the aforementioned NOx catalyst is caused to absorb NOx when the exhaust air/fuel state is lean while the three-way catalyst is caused to reduce and purify NOx released from the NOx catalyst when the exhaust air/fuel state becomes the stoichiometric air/fuel ratio or richer.

In this respect, generally, such a NOx absorbent as described above has a characteristic of lower absorptive ability for NOx the greater the NOx absorptive amount. Hence, in the aforementioned prior art, when an engine operation in the stratified combustion state continues over a long period of time, it is shifted to the homogeneous combustion state and the exhaust air/fuel state is made richer by compulsorily changing the in-cylinder air/fuel ratio into the rich side prior to the substantial decrease of the NOx absorptive performance by the NOx catalyst, to release NOx from the NOx catalyst and reduce and purify it with the three-way catalyst (hereinafter referred to as a compulsory NOx purge).

Also in the aforementioned prior art, when the engine is in a decelerating operating state and when a predetermined condition is fulfilled such as no manipulation of an accelerator pedal being made, a fuel cut control is performed which stops a fuel injection supply from a fuel injector, whereby an engine brake effect can be enhanced and a fuel consumption rate can be decreased.

Meanwhile, since an exhaust temperature state generally becomes lower compared to the time of the substantially stoichiometric air/fuel ratio as the in-cylinder air/fuel ratio becomes leaner, a temperature state of catalyst tends to be lower in a spark ignited direct injection engine which is in the stratified combustion state in the lower rotational speed and lower load region as in the aforementioned prior art and a diesel engine whose in-cylinder air fuel ratio becomes lean during almost all of the operating region. Furthermore, when the fuel cut control is performed as in the aforementioned prior art, thereby the aforementioned catalyst temperature state becomes extremely low and the exhaust purification performance by this catalyst might be deteriorated.

Also if the compulsory NOx purge were performed regardless of the engine operating condition as in the aforementioned prior art, when the engine is in an operating condition where vibration or noise is inherently low such as an idle operating condition, the combustion state might be compulsorily shifted from the stratified combustion through the homogeneous combustion to the stratified combustion and an output torque might vary. Even if the torque variation at this time is small, since it occurs regardless of driver manipulation, a driver tends to get a strange feeling and a driving feeling would be deteriorated if the occurring frequency were high.

SUMMARY OF THE INVENTION

It is an object of the present invention to improve the driving feeling in the overall engine operating region while maintaining the exhaust purification performance of for example a catalyst by elaborating a control process of the exhaust air/fuel state in terminating the fuel cut control and recovering the fuel supply in an engine fuel control apparatus which operates the engine in the lean in-cylinder air/fuel state in the lower rotational speed and lower load region and performs the fuel cut control under a predetermined condition.

Preferably, a recovery timing is determined when the engine shifts from a fuel cut state to an operating condition of lean in-cylinder air/fuel ratio and then controls an exhaust air/fuel state to be a state corresponding to or richer than a substantially stoichiometric air/fuel ratio if a catalyst is in a state of lower purification performance due to being over cooled or an increase of NOx absorptive amount.

Particularly, according to an aspect of the present invention, there is provided a fuel control apparatus of an engine equipped with a catalyst which performs a three-way purification function at least when an exhaust air/fuel state is a state corresponding to a substantially stoichiometric air/fuel ratio, an in-cylinder air/fuel ratio control device for controlling an in-cylinder air/fuel ratio which is an average air fuel ratio prior to an ignition in an in-cylinder combustion chamber to be leaner than the stoichiometric air/fuel ratio at least when the engine is in a predetermined region of low rotational speed and low load side, and a fuel cut control device for performing a fuel cut control for compulsorily stopping a fuel supply to the combustion chamber under a predetermined condition during a decelerating operation of the engine. And it is configured to comprise a low catalyst temperature state determining device for determining if the catalyst is in a predetermined low temperature state where its exhaust purification performance is deteriorated; and an exhaust air/fuel ratio control device for controlling the exhaust air/fuel state to be a state corresponding to or richer than the substantially stoichiometric air/fuel ratio when the low catalyst temperature determining device determines that the catalyst is in the low temperature state and when the fuel cut control by the fuel cut control device terminates and then the engine shifts to the predetermined region. At that time, the air/fuel ratio is preferably controlled between the stoichiometric air/fuel ratio and an air fuel ratio of 12 because unburned fuel in the exhaust gas increases the temperature of the catalyst if the air/fuel ratio exceeds 12.

Accordingly, when the engine is in the predetermined region of low rotational speed and low load side, the in-cylinder air/fuel ratio of the engine is controlled to be leaner than the stoichiometric air/fuel ratio so as to reduce the fuel consumption rate. Also when the predetermined condition is established in the decelerating operation of the engine, the fuel cut control device performs the fuel cut control to prevent the wasteful fuel consumption. During this fuel cut control, air induced into the combustion chamber of engine will be discharged into the exhaust passage whereby the temperature state of the catalyst will rapidly decrease.

When the temperature state of the catalyst becomes lower as described above and becomes the predetermined lower temperature state where the exhaust purification performance is deteriorated, this state is determined by the low catalyst temperature state determining device. And when the fuel cut control terminates and the engine shifts into the predetermined region, the exhaust air/fuel state is controlled to be the condition corresponding to or richer than the substantially stoichiometric air/fuel ratio (hereinafter also referred to as enrichment).

That is, in the operating region where the exhaust air/fuel state becomes inherently lean, the exhaust air/fuel state is temporarily enriched in the recovery from the fuel cut control, the exhaust temperature will be increased, whereby the temperature state of the catalysts can be increased to prevent a deterioration of exhaust purification performance. Also, the driver would not have a strange feeling even if the output torque of the engine varies due to the enrichment of air/fuel ratio because of the inherent recovery timing where a fuel injection mode changes.

Next, according to another aspect of the present invention, there is provided a fuel control apparatus of an engine equipped with a NOx absorbent which absorbs NOx in exhaust gas of excess oxygen atmosphere and releases the absorbed NOx due to a decrease of oxygen concentration, a catalyst which performs a three-way purification function at least when an air/fuel state of exhaust gas is a state corresponding to a substantially stoichiometric air/fuel ratio, an in-cylinder air/fuel ratio control device for controlling an in-cylinder air/fuel ratio which is an average air fuel ratio prior to an ignition in an in-cylinder combustion chamber to be leaner than the stoichiometric air/fuel ratio at least when the engine is in a predetermined region of low rotational speed and low load side, and a fuel cut control device for performing a fuel cut control for compulsorily stopping a fuel supply to the combustion chamber under a predetermined condition during a decelerating operation of the engine. And it is configured to comprise a NOx absorptive state determining device for determining if NOx absorptive amount of the NOx absorbent is equal to or more than a predetermined amount, and an exhaust air/fuel ratio control device for controlling the exhaust air/fuel state to be a state corresponding to or richer for the substantially stoichiometric air/fuel ratio when the NOx absorptive state determining device determines that the NOx absorptive amount exceeds the predetermined amount and when the fuel cut control by the fuel cut control device terminates and then the engine shifts to the predetermined region.

Accordingly, the engine is operated in the leaner in-cylinder air/fuel state when in the predetermined region of low rotational speed and low load side. In the operating condition of leaner air/fuel ratio, NOx in the excess oxygen atmosphere is absorbed in the NOx absorbent and when the NOx absorptive amount of this NOx absorbent is equal to or more than the predetermined amount, this condition is determined by the NOx absorptive state determining device. And if this determination is made, the exhaust air/fuel ratio control device controls the exhaust air/fuel state to be richer when the fuel cut control terminates and the engine shifts into the predetermined region.

By this, the exhaust air/fuel state is temporarily enriched at the time of recovery from the fuel cut control in the operating region where the exhaust air/fuel state is inherently lean then NOx is released from the NOx absorbent and is reduced and purified by the catalyst. Also due to the timing of the fuel recovery, the driver does not often have the strange driving sensation. That is, NOx purging at the timing of fuel recovery can improve a driving sensation while maintaining the exhaust purification performance of the NOx absorbent or the catalyst by decreasing a frequency of compulsory NOx purging in the lean air/fuel ratio operation.

According to another aspect of the present invention, the exhaust air/fuel ratio control device correctively controls the in-cylinder air/fuel ratio to be the substantially stoichiometric air/fuel ratio or richer and it comprises a throttle valve for controlling intake air amount into the in-cylinder of the engine, a throttle opening control device for controlling according to an accelerator manipulative amount and an engine operating condition and closing the throttle valve during the execution of the fuel cut control by the fuel cut control device, and a throttle opening operation regulating device for regulating the control of the throttle valve opening operation by the throttle valve opening control device if the accelerator operating amount is zero when the corrective control of in-cylinder air fuel ratio by the exhaust air/fuel ratio control device is executed.

Accordingly, during the execution of the engine fuel cut control, closing of the throttle valve by the throttle valve opening control device decreases the exhaust air amount from the combustion chamber as much as possible and hereby cooling of the catalyst is suppressed. Also the corrective control is executed to cause the in-cylinder air/fuel ratio to be rich when the engine returns from the fuel cut control to the predetermined lean air/fuel ratio region. At this time, if the accelerator manipulative amount is zero, that is, the engine returns to an idle operating condition, the throttle valve opening regulation device regulates the opening operation control of the throttle valve and the throttle valve opening is maintained in a relatively small state. Hereby, a torque variation due to the corrective control of the in-cylinder air/fuel ratio to the rich side can be suppressed.

According to another aspect of the invention, a fuel injector is provided which injects fuel directly into the in-cylinder combustion chamber, the fuel cut control device terminates the fuel cut control when the engine rotational speed becomes less than a predetermined recovery rotational speed, and the exhaust air/fuel ratio correction device causes the fuel injector to additionally inject fuel during a cylinder expansion stroke or a cylinder exhaust stroke so that the exhaust air/fuel state becomes a state corresponding to or richer than the substantially stoichiometric air/fuel ratio. At that time, the air/fuel ratio is preferably controlled between stoichiometric air/fuel ratio and an air fuel ratio of 12 because unburned fuel in the exhaust gas decreases the temperature of the catalyst if the air/fuel ratio exceeds 12. Moreover, the present invention comprises a throttle valve for controlling an intake air amount of the engine, and a throttle opening control device for closing the throttle valve when the fuel cut control is performed by the fuel cut control device and causing the throttle valve to operate to open even if the fuel cut control is performed when the engine rotational speed decreases to a set rotational speed higher than the recovery rotational speed if the catalyst is determined to be in the low temperature state by the low catalyst temperature determining device.

Accordingly, during the execution of the engine fuel cut control, the closing the throttle valve by the throttle valve opening control device decreases the exhaust air flow from the combustion chamber as much as possible whereby cooling of the catalyst is suppressed. And when the engine rotational speed decreases to the predetermined rotational speed during the execution of this fuel cut control, the throttle opening control device operatively opens the throttle valve. Following this, when the engine rotational speed decreases to the recovery rotational speed, that is, the fuel cut control terminates and fuel injection supply to the combustion chamber by the fuel injector is resumed, an intake air amount to the combustion chamber will sufficiently increase.

At this time, the fuel injector makes the additional injection of fuel during the cylinder expansion stroke or exhaust stroke to make the exhaust air/fuel state. That is, a large amount of high temperature exhaust is supplied to the catalyst by sufficiently increasing the exhaust flow and enriching an air/fuel state of that exhaust at the time of the recovery from the fuel cut condition and an temperature state of that can be rapidly increased. Further, when the fuel is additionally injected during the cylinder expansion stroke or exhaust stroke, rotational increase (torque increase) caused by the injection is small and a rotational variation (torque variation) is small even at the timing of the termination of the additional injection.

According to another aspect of the invention, a fuel injector is provided which injects fuel directly into the in-cylinder combustion chamber, the fuel cut control device terminates the fuel cut control when the engine rotational speed becomes less than a predetermined recovery rotational speed, and the exhaust air/fuel ratio correction device causes the fuel injector to additionally inject fuel during a cylinder expansion stroke or a cylinder exhaust stroke so that the exhaust air/fuel state is the state corresponding to the substantially stoichiometric air/fuel ratio or richer. At that time, the air/fuel ratio is preferably controlled between stoichiometric air/fuel ratio and an air fuel ratio of 12 because unburned fuel in the exhaust gas decreases the temperature of the catalyst if the air/fuel ratio exceeds 12. Moreover, the present invention comprises: a throttle valve for controlling an intake air amount of the engine; a low catalyst temperature determining device for determining if the catalyst is in a predetermined low temperature state where its exhaust purification performance is deteriorated; and a throttle opening control device for closing the throttle valve when the fuel cut control is performed by the fuel cut control device and causing the throttle valve to operate to open even if the fuel cut control is performed when the engine rotational speed decreases to a set rotational speed higher than the recovery rotational speed if the catalyst is determined to be in the low temperature state by the low catalyst temperature determining device.

Accordingly, the same function and effect as the aforementioned aspect is obtained. That is, at the time of resuming the fuel injection supply to the combustion chamber, an intake air amount to the combustion chamber is sufficiently increased and then the exhaust air/fuel state can be enriched, thereby NOx purge utilizing the fuel recovery timing is sufficiently enhanced and a catalyst activity can be more improved.

Next, according to another aspect of the present invention, there is provided a fuel control apparatus of an engine equipped with a catalyst performing a three-way purification function at least when an air/fuel state of exhaust gas is in a state corresponding to a substantially stoichiometric air/fuel ratio; an in-cylinder air/fuel ratio control device for controlling an in-cylinder air/fuel ratio which is an average air fuel ratio prior to an ignition in an in-cylinder combustion chamber to be leaner than the stoichiometric air/fuel ratio at least when the engine is in a predetermined region of low rotational speed and low load side; and a fuel cut control device for performing a fuel cut control of compulsorily stopping a fuel supply to the combustion chamber under a predetermined condition during a decelerating operation of the engine. And it is configured to comprise a duration determining device for determining if a duration of the fuel cut control by the fuel cut control device is equal to or more than a set time; and an exhaust air fuel/ratio control device for controlling an exhaust air/fuel state to be a state corresponding to a substantially stoichiometric air/fuel ratio or rich of that when the fuel cut control terminates and then the engine shifts to the predetermined region if the duration is determined to be equal to or more than the set time. At that time, the air/fuel ratio is preferably controlled between stoichiometric air/fuel ratio and an air fuel ratio of 12 because unburned fuel in the exhaust gas increases the temperature of the catalyst if the air/fuel ratio exceeds 12.

Accordingly, when the engine is in the predetermined region of lower rotational speed and lower load side, the in-cylinder air fuel ratio is controlled to be leaner than the stoichiometric air/fuel ratio and also the fuel cut control executed under the predetermined condition will cause a catalyst temperature state to rapidly decrease. And when the duration of the fuel cut control is equal to or more than the set time and this is determined by the duration determining device, the control by the exhaust air/fuel ratio control device and the exhaust air/fuel ratio is enriched.

That is, the longer the duration of the fuel cut control, the longer the catalyst will be cooled, and consequently the engine rotational speed is relatively high and air flow of the catalyst is large when the fuel cut control is commenced. Accordingly, the catalyst temperature state is very low at the time of termination of the fuel cut control.

Therefore, in this case, enriching the exhaust air/fuel state at the timing of recovery from the fuel cut control can prevent the deterioration of the exhaust purification performance by increasing the catalyst temperature state while reducing strange driving sensation felt by the driver.

BRIEF DESCRIPTION OF THE DRAWINGS

These and other objects, features, aspects, and advantages of the present invention will become more apparent from the following detailed description of the preferred embodiments with respect to the accompanied drawings, in which.

DETAILED DESCRIPTION OF PREFERRED EMBODIMENTS

Figure 1:
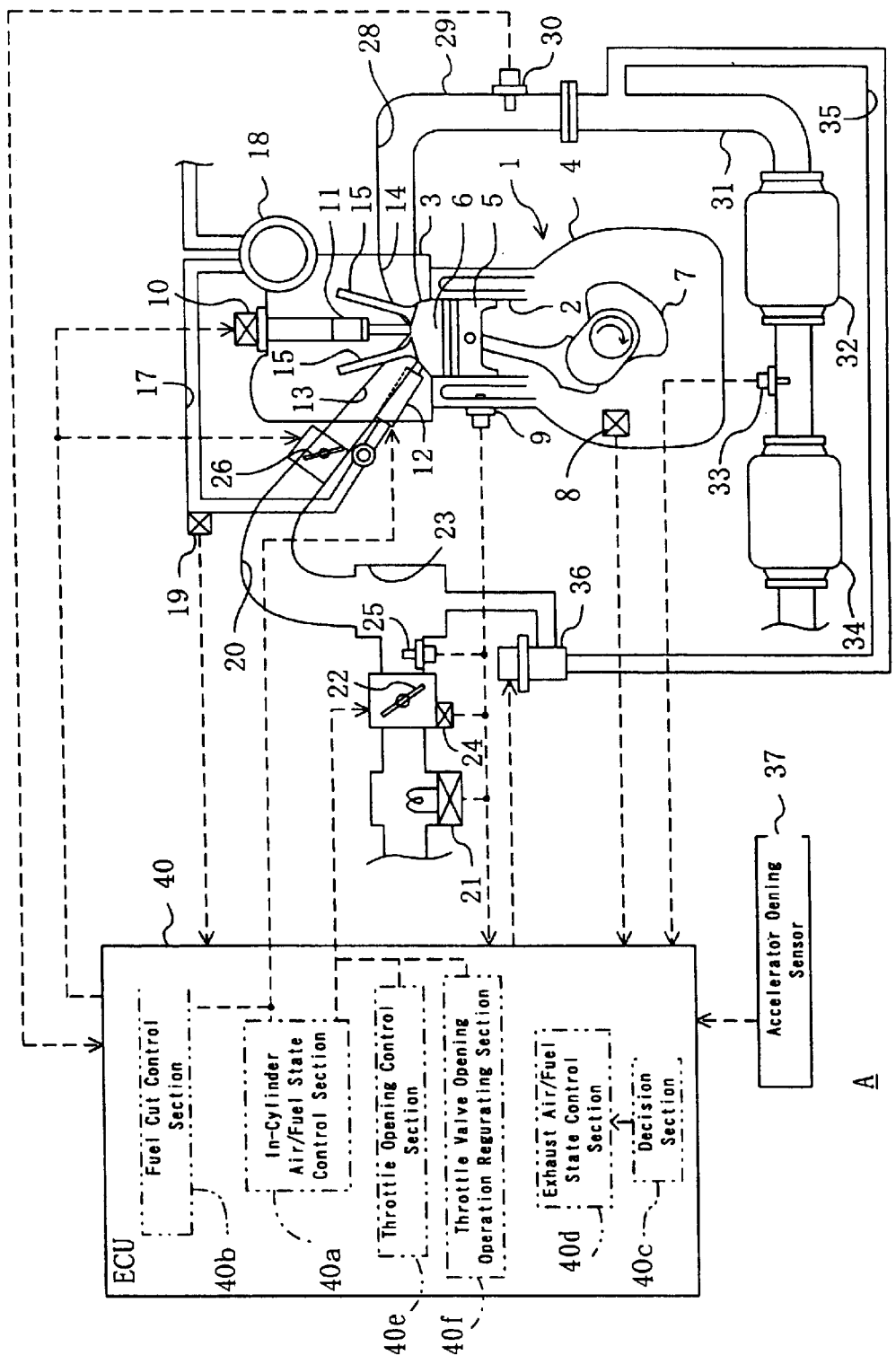
FIG. 1 is an overall configuration diagram of the engine fuel control apparatus according to a preferred embodiment of the present invention.

FIG. 1 illustrates an engine fuel control apparatus A according to an embodiment of the present invention wherein 1 is a multiple cylinder engine mounted on a vehicle. This engine 1 comprises a cylinder block 3 having a plurality of cylinders 2, 2, . . . preferably provided in line (only one is illustrated) and a cylinder head 4 disposed on this cylinder block 3. Into the each of cylinders 2 a piston 5 is fittingly inserted reciprocatively in the vertical direction of the FIGURE and in the cylinder 2 between the top surface of the piston 5 and the bottom surface of the cylinder head 4 a combustion chamber 6 is defined. On the other hand, within the cylinder block 3, a crank shaft 7 is rotatably supported and this crank shaft 7 and the piston 5 are connected by a connecting rod. In one end of the crank shaft 7 is disposed an electromagnetic crank angle sensor 8 which detects its rotational angle and further a water temperature sensor 9 is disposed facing a water jacket of the cylinder block 3.

Attached to the cylinder head 4 of each of the aforementioned cylinders 2 is a spark plug 11 connected to an ignition circuit 10 so as to preferably face the upper portion of the combustion chamber 6 while attached to the peripheral portion of said combustion chamber 6 is an injector (fuel injection valve) 12 so as to inject and supply fuel directly toward a center of the cylinder. That is, although not illustrated in detail, the aforementioned combustion chamber 6 is preferably of a pent roof type shaped like roofs two angled surfaces of ceiling parts which cross each other. In each of the angled surfaces are opened respectively two intake and exhaust ports 13, 14 and intake and exhaust valves 15, 15, . . . are disposed so as to open and close this respective opening end.

Further, the aforementioned injector 12 is disposed so as to be sandwiched between the two intake ports 13, 13 therebelow and its tip side injecting hole faces the peripheral portion of the combustion chamber 6 in the proximity of poppet portions of the two intake valves 15, 15. On the other hand, the injector 12 is connected to a high pressure fuel pump 18 via a fuel supply passage 17 which is common to all cylinders 2, 2, . . . , then this high pressure fuel pump 18 and a high pressure regulator (not shown) are configured to supply the fuel to the injector 12 while regulating the fuel into an appropriate pressure state. Additionally, a fuel pressure sensor 19 for sensing a pressure state of fuel inside (fuel pressure) is disposed in or at this fuel supply passage 17.

Then, in a case that the aforementioned injector 12 injects fuel in a middle of the compression stroke of the cylinder 2 or thereafter, the fuel spray forms a relatively rich mixture layer in the proximity of the spark plug 11. The formation of the layer may be caused by an elliptical cavity (not shown) formed on the top surface of the piston 5, or an airflow in the combustion chamber 6, for example. On the other hand in a case that the aforementioned injector 12 injects fuel during the intake stroke of the piston 2, the fuel spray is diffused among the combustion chamber 6 and sufficiently mixed with the intake air and forms substantially homogeneous mixture by the time of ignition.

As shown in FIG. 1, an intake passage 20 is connected to a side surface of the engine 1 (a side surface of the left side of the figure) so as to respectively communicate with the intake port 13 of the respective cylinder 2. This intake passage 20 is what supplies intake air filtered in an air cleaner (not shown) to the combustion chamber 6 of the engine 1. Along the passage 20, from an upstream side to a downstream side sequentially disposed are a hot wire type airflow sensor 21 detecting an intake air amount inducted to the engine 1, a throttle valve 22 preferably comprising a butterfly valve throttling the intake passage 20 and a surge tank 23. The aforementioned throttle valve 22 is not mechanically connected to an accelerator pedal (not shown) but preferably is of an electric type opening and closing with its valve shaft being rotated by an electric motor. Further, a throttle opening sensor 24 for detecting an opening of said throttle valve 22 and an intake air pressure sensor 25 for detecting a pressure state downstream of said throttle valve 22.

Then, the intake passage 20 downstream side of the aforementioned surge tank 23 is configured to be an independent passage branching off for each cylinder 2 and the downstream end portion of the respective independent passage further branches and communicates respectively with the intake port 13. In one of the branch passages a swirl control valve 26 is provided and when the swirl control valve 26 is closed most intake air will flow from the other of the branch passages to the combustion chamber 6 thereby generating a strong swirl in the combustion chamber 6. On the other hand in a case that the swirl control valve is closed, from both of the branch passages the intake air will be inducted thereby strengthening a tumble component and weakening the swirl component.

On the other hand, in the other side surface of the engine 1 (a side surface of the right side of the figure), an exhaust passage 28 is connected which discharges combusted gas from the combustion engine 6. An upstream end portion of this exhaust passage 28 comprises an exhaust manifold 29 which branches off for each cylinder 2 and communicates with the exhaust port 14, downstream end portions of said exhaust manifold 29 collect and in this collecting portion a first oxygen concentration sensor 30 is disposed which detects an oxygen concentration in the exhaust gas. This first oxygen concentration sensor 30 comprises a lambda O2 sensor whose output stepwise reverses at the stoichiometric air/fuel ratio. Then, connected to the collecting portion of the exhaust manifold 29 is an upstream end of the exhaust pipe 31 while connected to a downstream end of this exhaust pipe 31 are a three-way catalyst 32 and a lean NOx catalyst 34 and further disposed between said both of catalysts 32, 34 in the exhaust passage 28 is a second oxygen concentration sensor 33 comprising a lambda O2 sensor as in said first oxygen concentration sensor 30.

Then, to the upstream side of said exhaust pipe 31, an upstream end of an exhaust gas recirculation (EGR) passage 35 for recirculating a part of the exhaust gas flowing through the exhaust passage to the intake system is branched and connected, a downstream end of this EGR passage 35 is connected to the intake passage 20 between said throttle valve 22 and surge tank 23 or at the surge tank 23, and in its proximity preferably an electric type of EGR valve 36 is disposed whose opening is regulated by an electric motor.

Although not illustrated in detail, the upstream side three-way catalyst 32 forms two catalyst layers of an inside catalyst layer and an outside catalyst layer on a wall surface of a honeycomb shaped carrier made of cordierite and precious metals such as palladium Pd are deposited on the inside catalyst layer with a support material such as alumina and ceria while platinum or rhodium is deposited on the outside catalyst layer with a support material of ceria.

Then, the downstream side lean NOx catalyst 34 is a NOx absorbing and reducing type which absorbs NOx within the exhaust gas in the excess oxygen atmosphere where oxygen concentration in exhaust gas is higher and releases absorbed NOx and reduces and purifies NOx in a case that the oxygen concentration becomes, for example, 1–2% or less. This catalyst 34 preferably also has the two layer structure as the aforementioned three-way catalyst 32, platinum and NOx absorbent of barium are deposited in an inside catalyst layer with support materials of alumina and ceria while platinum, rhodium and barium are deposited in an outside catalyst layer with a support material of zeolite.

Figure 2:
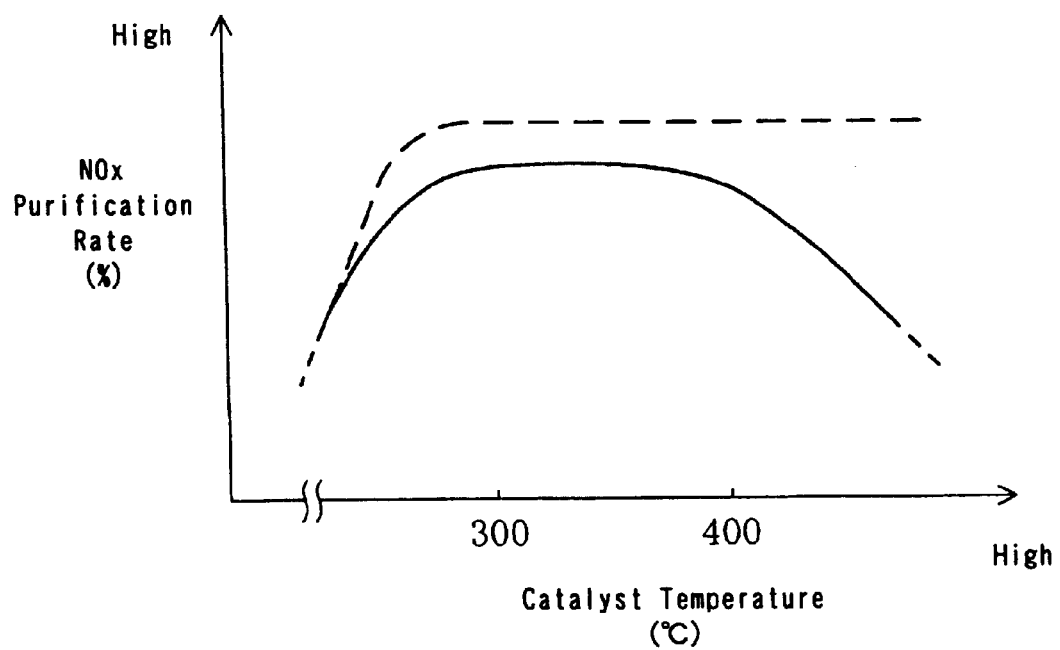
FIG. 2 is a diagram showing variation of NOx purification rate versus variation of catalyst temperature state comparing excess oxygen atmosphere (solid line) and state corresponding to a substantially stoichiometric air/fuel ratio (broken line).

NOx purification performance by the lean NOx catalyst 34 has a temperature dependency as shown in FIG. 2.

That is, the lean NOx catalyst 34 is not active when its temperature state is below 200° C., NOx purification performance improves as temperature is higher and the highest purification performance will be obtained in the range of about 250–400° C. And in case of the excess oxygen atmosphere, as being illustrated with a solid line in the figure, the NOx purification performance deteriorates again as the temperature state becomes higher than 400° C. On the other hand in case that the exhaust gas is in a state corresponding to the substantially stoichiometric air/fuel ratio, the lean NOx catalyst 34 has a similar function to that of the three-way catalyst 32 and shows extremely high NOx purification performance in a temperature state of about 250° C. or higher as illustrated with a dotted line in the figure.

Because of the configuration of the two catalysts 32, 34 as described above, in case where the engine is operated at the substantially stoichiometric air/fuel ratio, the catalysts 32, 34 perform a three-way purification function, and HC, CO and NOx react and are substantially purified. On the other hand, in a case where the engine is operated under the lean air/fuel condition, NOx in the exhaust gas is absorbed and eliminated by the lean NOx catalyst 34.

The aforementioned ignition circuit 10, injector 12, motor of the throttle valve 22, actuator of the swirl control valve 26, actuator of EGR valve 36, etc. are operatively controlled by a control unit 40 (hereafter referred to as an engine control unit, ECU). Output signals at least from the aforementioned crank angle sensor 8, water temperature sensor 9, airflow sensor 21, throttle opening sensor 24, intake air pressure sensor 25 and oxygen concentration sensor 30, 33 are input and additionally an output signal from the accelerator opening sensor 37 and respective output signals from an intake air temperature sensor for detecting intake air temperature and an atmospheric pressure sensor for sensing an atmospheric pressure are received by the ECU 40.

(Overview of Engine Control)

The aforementioned ECU 40 controls, as control parameters related to the engine output, fuel injection amount and injection timing of the injector 12, intake air amount regulated by the throttle valve 22, intake air swirl strength adjusted by the swirl control valve 26, exhaust recirculation rate adjusted by the EGR valve 36, etc. respectively according to the operating condition of the engine 1. And the engine 1 is configured to operate either in the stratified combustion state or homogeneous combustion state with the fuel injection form of the injector 12 being shifted based on the operating condition of the engine 1.

Figure 3:
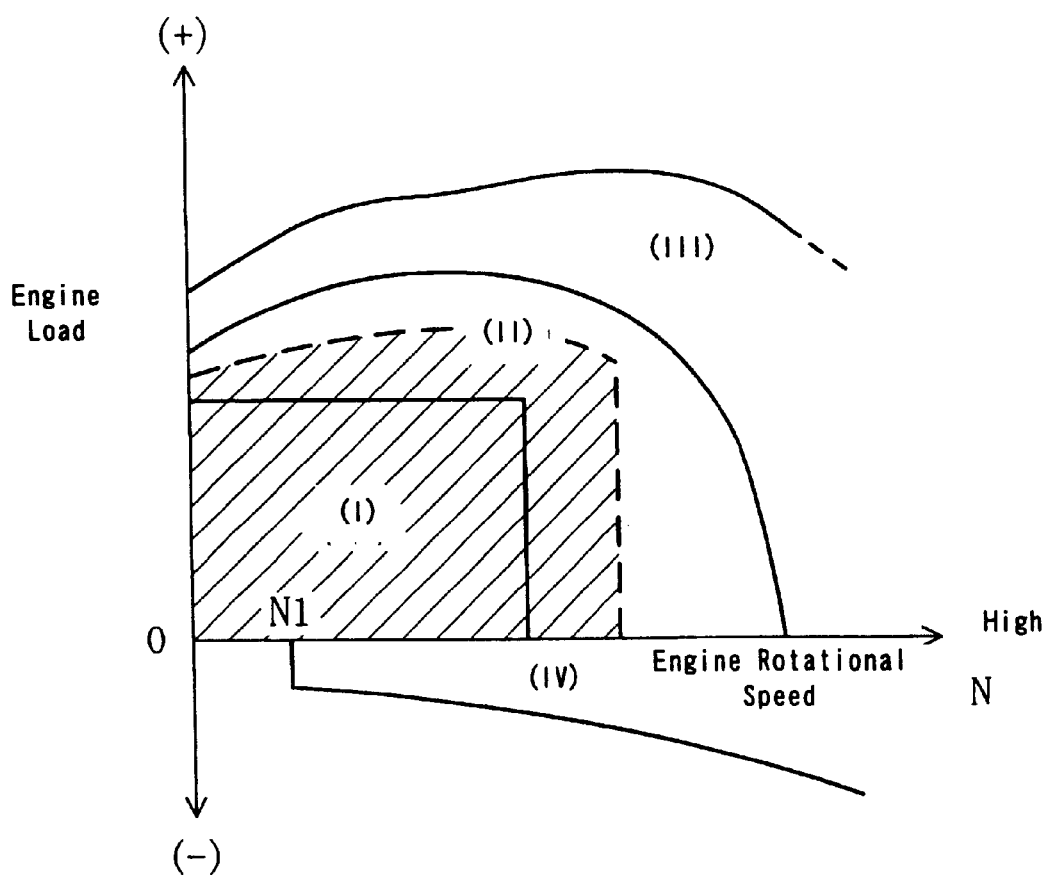
FIG. 3 is a diagram showing an example a of control map setting engine operating regions according to the embodiment of the present invention.

Particularly, as an example of a control map after engine warm up is illustrated in FIG. 3, among the whole operating region of the engine 1 defined by engine load and engine rotational speed N, a predetermined region of low rotational speed and low load side is set a stratified combustion region (I). That is, using as the engine load net mean effective pressure determined from an output value of, for example, the airflow sensor 21 and the engine rotational speed N, in a case of load condition of about a half of full load or less and the engine rotational speed N being about a half of a permissible maximum rotational speed or less, it is determined that the engine 1 is in the stratified combustion region (I).

Figure 4:
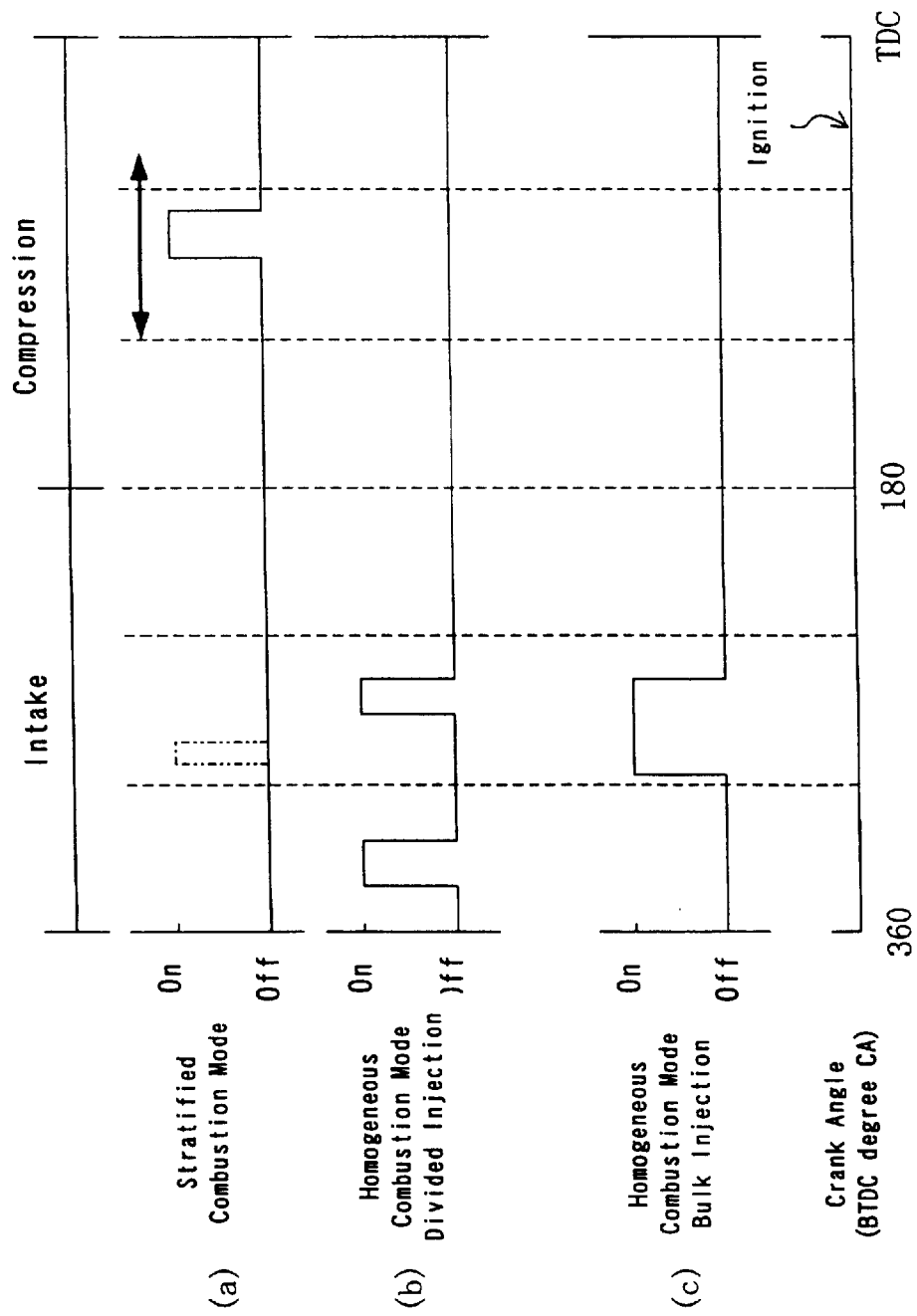
FIG. 4 is a time chart schematically showing modes of fuel injection by an injector.

Then in the stratified combustion region (I), as schematically illustrated in FIG. 4 (a), fuel is injected at one time by the fuel injector 12 in a middle of the compression stroke or later, in other words, e.g. a crank angle duration between BTDC 120 degrees CA and BTDC 35 degrees CA shown with the arrow in the FIGURE and the stratified combustion state is established where mixture unevenly exists near the spark plug 11. On the other hand, both of regions (II) and (III) of higher rotational speed or higher load sides than the aforementioned stratified combustion region (I) are set homogeneous combustion regions, as shown in FIG. 4 (b), (c), fuel is injected during the intake stroke of the cylinder 2 by the injector 12 and sufficiently mixed with the intake air and the homogeneous combustion state is established which combusts the homogeneous mixture which has been formed within the combustion chamber 6.

Then, at a time of a beginning of the vehicle's deceleration, when the engine 1 is in a condition of no load or minus load and when the engine rotational speed N is a predetermined rotational speed where the fuel cut control is initiated or above, until the engine rotational speed N decreases to reach a predetermined recovery rotational speed N1, in other words when the engine 1 is in a operating region (IV) of FIG. 3, the fuel cut control is executed which temporarily stops fuel injection by the injector 12 of the respective cylinder 2.

Further, although a control for the throttle valve 22 is basically made to adjust the throttle opening so as to achieve a required torque characteristic based on the accelerator opening and the engine rotational speed N, when the engine is set in the stratified combustion state, the control carried out to open the relative positions of the throttle valve 22 move in order to reduce the pumping loss and the in-cylinder air/fuel ratio at this time becomes in an extremely lean such as A/F=about 30–140.

Particularly, when the engine 1 is in the region (II) of homogeneous combustion state, the throttle opening is controlled to make the in-cylinder air/fuel ratio to be the substantially stoichiometric air/fuel ratio (A/F=14.7) (hereafter, this region is referred to as a "lambda=1" region). Also in a region (III) in a higher load side or higher rotational speed side adjacent to this "lambda=1" region (II), the fuel injection amount is incrementally adjusted to make the in-cylinder air/fuel ratio the stoichiometric air/fuel ratio or slightly richer (for example A/F=13–14) in order to obtain a higher output corresponding to the higher load (hereafter, this region is referred to as "enriched region"). Additionally, when the aforementioned fuel cut control is executed, the throttle valve 22 is closed to enhance the engine brake effect and to suppress cooling of the catalysts 32, 34 due to the air passing thereover.

Then, in a region indicated with hatched lines included in the aforementioned FIG. 3, the EGR valve 36 is caused to open and a part of the exhaust gas is caused to recirculate via the EGR passage 35 thereby a maximum combustion temperature can be properly decreased and NOx generation can be suppressed. Also in a time of the cooled engine, the engine 1 is caused to be in the homogeneous combustion state in all of the aforementioned operating region (I), (II) and (III).

Such operation controls for the injector 12 and the throttle valve 22 as described above are all realized by a CPU executing a control program electronically stored in a ROM of the ECU 40. That is, an in-cylinder air/fuel ratio control section 40a is configured by way of software which, using the process of the aforementioned operation control for the injector 22 and the throttle valve 22, controls the in-cylinder air/fuel ratio to be lean of the stoichiometric air/fuel ratio when the engine 1 is in the stratified combustion region (I) of lower rotational speed and lower load side while switching and controlling the in-cylinder air/fuel ratio to be the substantially stoichiometric air/fuel ratio or richer than that in the "lambda=1" region (II) or the enriched region (III).

Also a fuel cut control section 40b is configured by way of software using a control process which stops the fuel injection by the fuel injector 12 under the predetermined condition during the decelerating operation of the engine 1.

In addition to the basic control as described above, in order to make the aforementioned lean NOx catalyst to steadily demonstrate the purification performance, this embodiment is configured to estimate the NOx absorptive amount in this catalyst 34, and to control the exhaust air/fuel state to be the substantially stoichiometric air/fuel ratio before the NOx absorption causes the NOx absorptive amount to saturate to cause the catalyst 34 to release the NOx absorbed therein and reducingly purify it (hereafter referred to as "compulsory NOx purge")

And if the estimated NOx absorptive amount in the lean NOx catalyst 34 becomes equal to or more than a set amount (second set amount S2 which will be described) less than a saturation determining criteria of the catalyst 34 or if a temperature state of the lean NOx catalyst 34 or the three-way catalyst 32 upstream of it decreases to be the low temperature state where the exhaust purification performance deteriorates, when the aforementioned fuel cut control section 40b terminates and the engine shifts to the stratified combustion region (I), the exhaust air/fuel state is enriched as the aforementioned compulsory NOx purge to ensure the exhaust purification performance.

In other words, the aforementioned ECU 40 is provided with a catalyst purification state determining section 40c for determining a predetermined low temperature state where the exhaust purification performance by the aforementioned catalysts 32, 34 deteriorates and for determining whether the NOx absorptive amount of the NOx absorbent in the lean NOx catalyst 34 is equal to or more than a predetermined amount (catalyst low temperature state determining device, NOx absorption state determining device), and an exhaust air/fuel control section 40d for enriching the exhaust air/fuel state utilizing a recovery timing from the aforementioned fuel cut condition when the catalyst purification state determining device 40c determines the exhaust purification performance of the catalysts 32, 34.

(Air/fuel Control Process)

Figure 5:
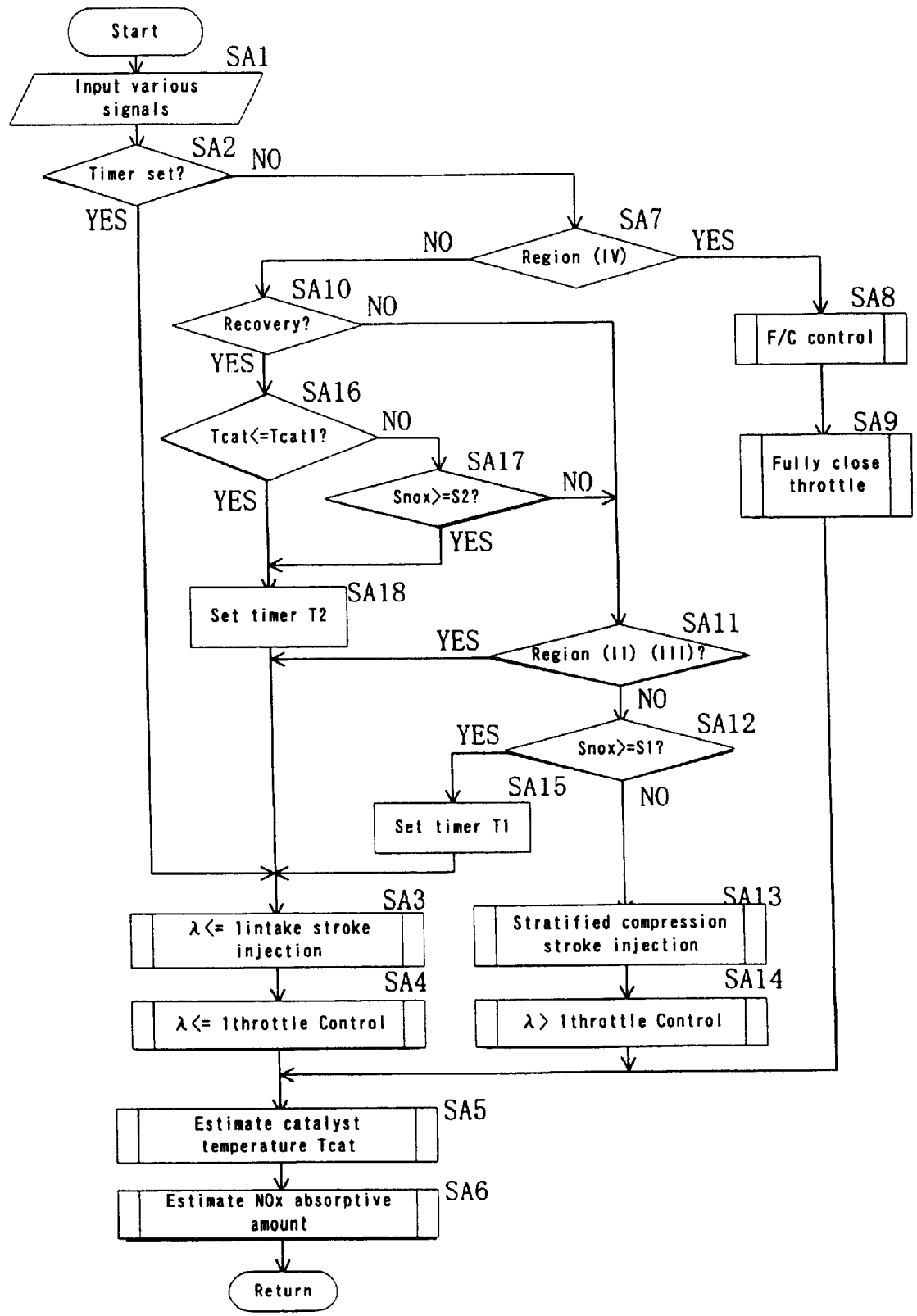
FIG. 5 is a flow chart showing a procedure of air/fuel control by an ECU.

Air/fuel ratio control process of the engine 1 by the aforementioned ECU 40 will be particularly explained according to a flow chart of FIG. 5.

Firstly, in step SA1 after the start, signals from various sensors such as the crank angle sensor 8, water temperature sensor 9, airflow sensor 21 and accelerator opening sensor 35 are input into the ECU 40 and various data from the memory of the ECU 40 are read. Next in step SA2, it is determined whether a rich timer is set which indicates a duration during which the exhaust air/fuel state is correctively enriched, and the process proceeds to step SA7 if this determination is NO while if YES the process proceeds to step SA3 and causes the fuel to be injected during the intake stroke of the cylinder 2 so as to make the in-cylinder air/fuel ratio of the engine 1 to be the substantially rich air/fuel ratio (Lambda<=1 intake stroke injection)

Next in step SA4, the opening of the throttle valve 22 is controlled according to the operating condition of the engine 1 so that the in-cylinder air/fuel ratio of the engine 1 is the substantially stoichiometric air/fuel ratio (Lamda<=1 throttle control). That is, while the rich timer is set, the engine 1 is operated in the homogeneous combustion state with the relatively rich in-cylinder air/fuel ratio regardless of the load state or the rotational speed N. Further in this instance, in order to cancel the large variation of output torque of the engine 1, the ignition timing is temporarily corrected to a retard side (Ignition retard).

Next in step SA5, the temperature state of the catalysts 32, 34 is estimated. In detail, while a temperature state Tcat of the lean NOx catalyst 34 which has a relatively low temperature state among the two catalysts 32, 34 is estimated, this estimation of catalyst temperature Tcat may be made, for example, based on the engine water temperature e.g. sensed by the water temperature sensor 9 and operating history of the engine 1. Next in step SA6, NOx absorptive amount Snox in the lean NOx catalyst 34 is estimated at this time and then the process returns. An estimating method for the aforementioned NOx absorptive amount may be, for example, to integrate running distance of the vehicle or operating time of the engine 1 and whole injection amount during that time period and to estimate the NOx absorptive amount based on the integration.

Also in step SA7 proceeded when NO is determined where the rich timer is not set in the aforementioned step SA2, it is determined whether a condition of executing the fuel cut control is established (region (II)). That is, for example, when the engine rotational speed N is equal to or more than the predetermined start rotational speed for the fuel cut control and when the accelerator manipulation amount is zero, YES is determined where the engine is in a region (IV) of fuel cut control to be executed, the process proceeds to step SA8 and it stops the fuel injection by the injector 12. Following this, at step SA9 the throttle valve 22 is positioned in an approximately fully closed state, then the process proceeds to the step SA5.

As described above, by closing the throttle valve 22 during the fuel cut control, the engine brake effect enhances and the air flow amount to the catalyst 32, 34 becomes as less as possible, whereby a lowered temperature state of the catalyst 32, 34 can be prevented.

Contrary to this, when the decision at the step SA7 is NO and when the engine 1 is in the region (IV), the process proceeds to step SA10 and determines whether it is a timing at which the process is to terminate the fuel cut control and to resume the fuel injection supply by the injector 12, that is, a timing of fuel recovery.

Particularly, when the fuel cut control is executed and when the accelerator pedal is stepped on, or when the engine rotational speed N becomes equal to a predetermined recovery rotational speed N1 (see FIG. 3), YES is determined and the process proceeds to step SA16 while if the determination is NO, it proceeds to step SA11.

At this step SA11, it is determined which one of the "lambda=1" region (II) and the enriched region (III) the engine 1 is in, then, the process proceeds to the step SA3 described before if the determination is YES and the engine 1 is in either one of the regions (II) and (III), and the process makes fuel injected during the intake stroke of the cylinder 2 to make the in-cylinder air fuel ratio the substantially stoichiometric air/fuel ratio in case of the "lambda=1" region (II) and make it richer than the stoichiometric air/fuel ratio in case of the "enriched region". Following this, the steps SA4 through SA6 described before are executed, then the process returns.

That is, when the engine 1 is in the "lambda=1" region (II) or the enriched region (III), the process controls the fuel injection amount by the injector 12 and the intake air amount to maintain the in-cylinder air/fuel ratio at a proper state in terms of balance between the output and the exhaust purification. At this time, since the exhaust air/fuel ratio state becomes a state corresponding to or richer than the substantially stoichiometric air/fuel ratio, the absorbed NOx into the lean NOx catalyst 34 is released and reduced.

On the other hand, in the case where the decision at the step SA11 described before is NO, the engine is considered to be in the stratified combustion region (I), then at the following step SA12, the NOx absorptive amount Snox in the lean NOx catalyst 34 estimated in the step SA6 described before is compared with a predetermined first set amount S1. This first set amount S1 is set to correspond to a state which is slightly less than the saturation of the NOx absorptive amount of the lean NOx catalyst 34. Accordingly, since the compulsory NOx purge is needed if Snox>=S1, the process proceeds to a step SA15, while the process proceeds to a step SA13 to cause the injector to inject the fuel during the compression stroke of the cylinder 2 so as to form the stratified combustion state if Snox<=S1, that is, the NOx absorptive amount of the catalyst 34 has a margin. Following this, at the step SA14, the opening of the throttle valve 22 is controlled to make the in-cylinder air/fuel ratio lean corresponding to the stratified combustion state, then the process proceeds to the step SA5 described before.

Also at a step SA15 to which the process proceeded after YES is determined at the step SA12, a time T1 during which the exhaust air/fuel ratio state is enriched for the compulsory NOx purge is set into the rich timer, then the process proceeds to the step SA3 and injects the fuel during the intake stroke of the cylinder 2 so that the in-cylinder air/fuel ratio of the engine 1 becomes the substantially stoichiometric air/fuel ratio. Following this, until the period T1 passes, the steps SA4 through SA6 are executed, the process returns. In this connection, the time T1 corresponds to a time required to release almost all of the absorbed NOx in the lean NOx catalyst 34 when the exhaust air/fuel ratio is at a state corresponding to the substantially stoichiometric air/fuel ratio.

That is, the process ordinarily controls the engine 1 to be in the stratified combustion state when it is in the stratified combustion region (I), while the process executes the compulsory NOx purge when the NOx absorptive amount of the NOx catalyst 34 is likely to saturate, which results in both an improved fuel consumption rate and secured NOx purification performance at the low rotational speed and low load region.

Still further, at a step SA16 to which the process proceeds after it determines YES of the recovery timing from the fuel cut control at the step SA10, the estimated catalyst temperature Tcat estimated at the step SA5 is compared with a predetermined set temperature Tcat1. This set temperature Tcat1 is set between about 200° C. and about 250° C. as a predetermined low temperature state where the exhaust purification performance by the lean NOx catalyst 34. Accordingly, the process proceeds to a step SA18 to increase the exhaust temperature and enhance the heating up of the catalysts 32, 34 if Tcat<=Tcat1, while it proceeds to the step SA17 if Tcat>Tcat1.

Then, at this step SA17, it is determined whether the NOx absorptive amount Snox in the lean NOx catalyst 34 is equal to or more than a second set amount S2 which is less than the first set amount S1. This second set amount S2 is set in a boundary-like sense that execution of the NOx purge at the recovery timing is preferable in terms of balance between the reduced fuel consumption rate and the secured NOx purification performance. The process proceeds to a step SA18 to execute the NOx purge if Snox>=S2 if the decision in SA17 is YES, while it proceeds to the step SA11 if Snox<S2.

Then at the step SA18, a time T2 during which the in-cylinder air/fuel ratio is correctively enriched is set in the rich timer respectively so as to match the estimated catalyst temperature Tcat in a case of processing from the step SA16 and so as to match the NOx absorptive amount Snox in the catalyst 34 in case of processing from the step SA17. Following this, the process proceeds to the step SA3, makes the injector 12 inject fuel during the intake stroke of the cylinder 2 so that the in-cylinder air/fuel ratio is the substantially stoichiometric air/fuel ratio and executes control procedure of the steps SA4 through SA6, then returns. In case of processing from the step SA 16, the air/fuel ratio is controlled between stoichiometric air/fuel ratio and air fuel ratio of 12 because if the air/fuel ratio exceeds 12, temperature of the catalyst falls owing to a greater amount of unburned fuel contained in the exhaust gas.

That is, the exhaust purification performance by the catalysts 32, 34 is secured by enriching the exhaust air/fuel ratio state while utilizing the recovery timing from the fuel cut control of the engine 1, if the temperature state of the lean NOx catalyst 34 falls and becomes a low temperature state of the degraded exhaust purification performance, or if the NOx absorptive amount in the lean NOx catalyst 34 increases to some extent.

The steps SA3, SA4, SA13 and SA14 of flow illustrated in the FIG. 5 correspond to the in-cylinder air/fuel ratio control section 40a, also the step SA8 corresponds to the fuel cut control section 40b and the steps SA16 and SA17 corresponds to the catalyst purification state determining section 40c.

Control procedure where the process proceeds to the step SA3 if YES is determined at either of the steps SA16 and SA17 corresponds to the exhaust air/fuel ratio control section 40d which controls the exhaust air/fuel ratio state to be the substantially stoichiometric air/fuel ratio when the engine 1 returns from the fuel cut state to the stratified combustion region (I) if the catalysts 32, 34 are in the predetermined low temperature state or if the estimated NOx absorptive amount of the lean NOx catalyst 34 is equal to or more than the second set amount S2.

Further a throttle opening control section 40e is configured to control the opening of the throttle valve 22 according to the accelerator manipulation amount and the operating condition of the engine 1 by the steps SA4, SA9 and SA14 and close the throttle valve 22 during the execution of the fuel cut control by the fuel cut control section 40b.

Still further, when the process proceeds to the steps SA3 and SA4 after YES is determined at either of the steps SA16 and SA17 as described above, if the accelerator manipulative amount were zero, the engine 1 would return to the idle operating state and the throttle valve 22 would be maintained at the substantially fully closed state as during the execution of the fuel cut control. That is, the opening of the throttle valve 22 at this time becomes relatively small compared to that during the idle operation in the usual stratified combustion state. Accordingly, a throttle valve opening operation regulating section 40f is configured to regulate the opening operation control of the throttle valve 22 by the throttle opening control section 40e when the exhaust air/fuel control section 40d correctively enriches the in-cylinder air/fuel ratio by the control procedure of processing from the steps SA16 and SA17 to the steps SA3 and SA4.

(Function and Effect of Embodiment)

Function and effect of the embodiment described above will be explained.

By the in-cylinder air/fuel ratio control of the engine 1 by the ECU 40 as described above, initially when the engine 1 is in the stratified combustion region (I) of low rotational speed and low load side, the injector 12 usually injects fuel mainly at or later than a middle of the compression stroke to form the stratified combustion state so that an operating state with less pumping loss and improved fuel consumption rate is obtained. At this time the exhaust air/fuel ratio state becomes an extremely lean state as is the in-cylinder air/fuel ratio, but NOx in the exhaust gas is absorbed into the lean NOx catalyst 34 and a discharge of NOx to the atmosphere is sufficiently reduced.

Figure 6:
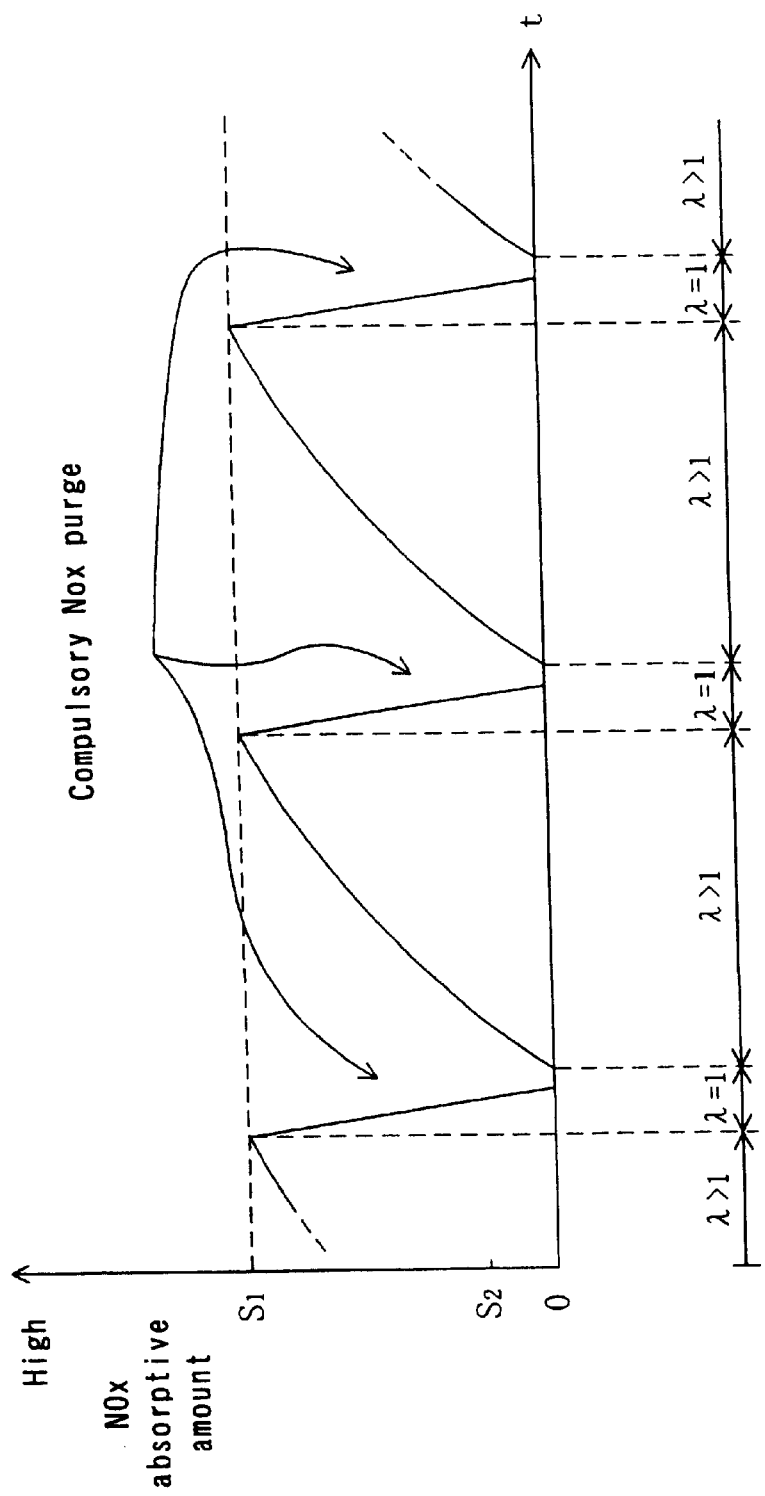
FIG. 6 is a time chart showing a variation of NOx absorptive amount of a catalyst when a compulsory NOx purge is made.

When the combustion continues in the stratified combustion region (I) of the engine 1 and the NOx absorptive amount in the catalyst 34 gradually increases, whereby the NOx absorptive capacity of the catalyst 34 will decrease and the NOx absorptive ability of the catalyst 34 will gradually deteriorate. Contrary to this, as an example shown in FIG. 6, when the NOx absorptive amount Snox reaches the first set amount S1, the compulsory NOx purge is executed, NOx is released and reducingly purified before the NOx absorptive amount of the catalyst 34 saturates.

On the other hand, when the engine is in the homogeneous combustion region (II), (III), the injector 12 injects fuel mainly during the intake stroke of the cylinder 2 to form the homogeneous combustion state and obtain the high output corresponding to the high load, and the exhaust air/fuel ratio becomes the substantially stoichiometric air/fuel ratio or richer than that whereby the absorbed NOx in the catalyst 34 is released and reducingly purified.

Figure 7:
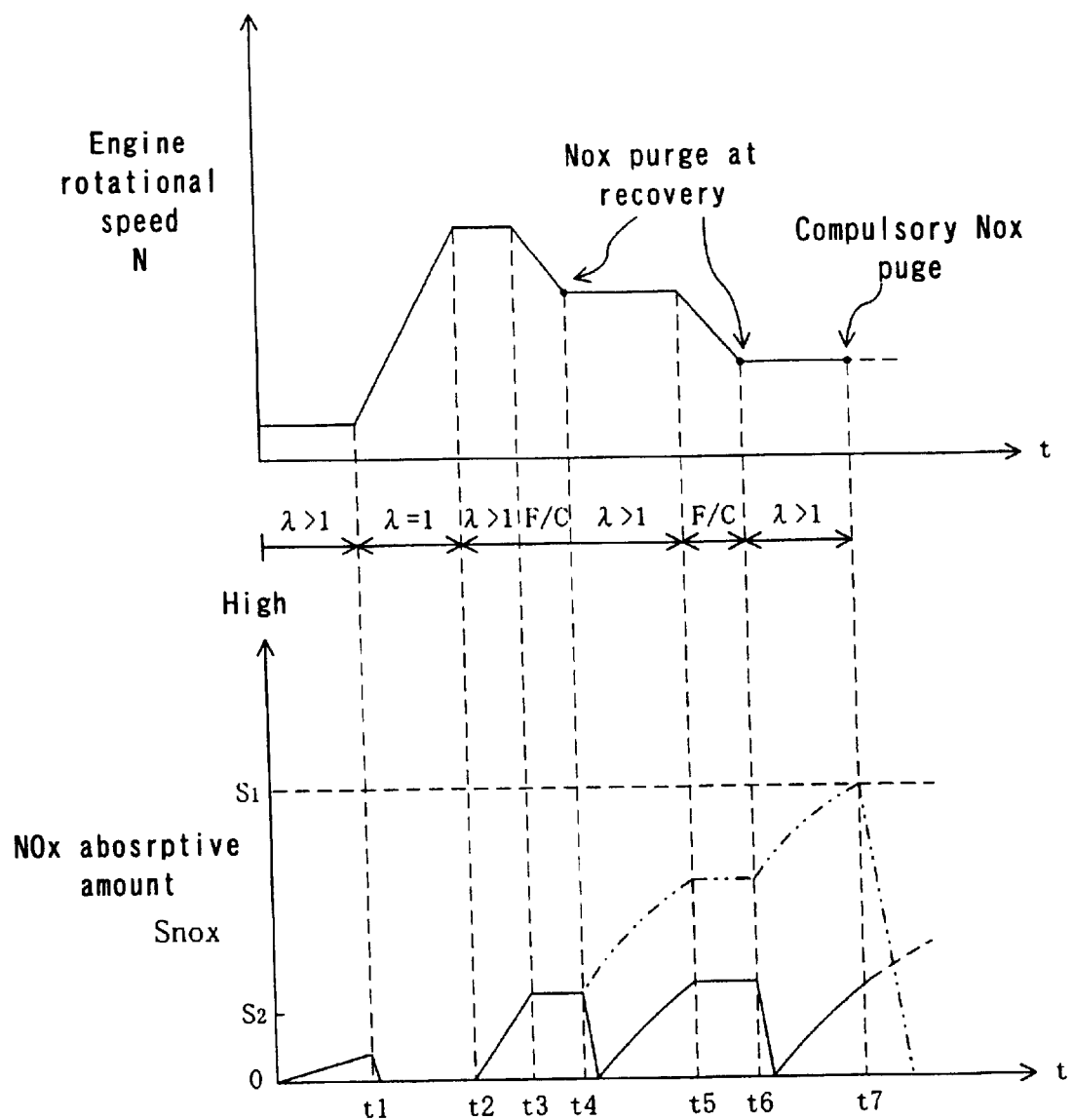
FIG. 7 is a time chart showing an engine rotational speed N, an exhaust air/fuel state and the NOx absorptive amount comparing those with each other when the operating condition of the engine variously changes.

Herein, a variation of the NOx absorptive amount in the catalyst 34 when the engine rotational speed N varies such as shown in FIG. 7 will be particularly explained.

Firstly when the engine is in an idle operation state (until t1), the NOx absorptive amount gradually increases because of relatively small NOx generative amount and small exhaust flow. Next, when the engine 1 achieves, for example, an accelerating operation state and is operated in the homogeneous combustion state (between t1 and t2), the absorbed NOx in the catalyst 34 is released and reducingly purified since the exhaust air/fuel ratio is at the substantially stoichiometric air/fuel ratio or richer.

Following this, when the engine 1 is operated at a constant speed of high revolution side in the stratified combustion region (between t2 and t3), the NOx absorptive amount of the catalyst 34 rapidly increases, but thereafter in the fuel cut state during the engine decelerating operation (between t3 and t4), the NOx absorptive amount does not vary (between t3 and t4). Also in this fuel cut state, to suppress the cooling of the catalysts 32, 34 by the air flowing through the catalysts 32, 34, the throttle valve 22 is positioned in the substantially fully closed state, nevertheless the temperature state of the catalysts 32, 34 will gradually decrease.

Figure 8:
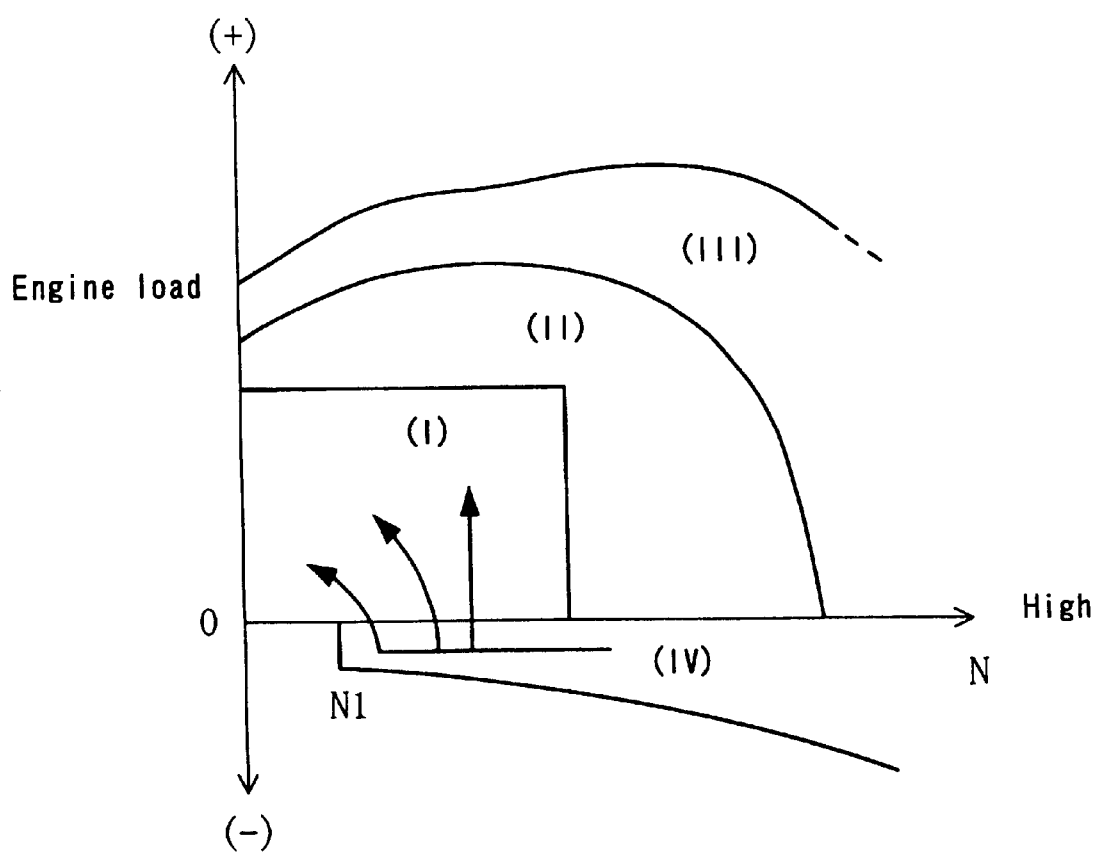
FIG. 8 is a diagram schematically showing the recovery from the fuel cut control.

When the accelerator pedal is stepped on or when the engine rotational speed N reaches the recovery rotational speed N1, that is, when the fuel cut control terminates and the engine 1 shifts to the stratified combustion state (region (I)) as schematically shown in FIG. 8 (t=t4), the engine 1 is temporarily placed in the homogeneous combustion state and the in-cylinder air/fuel ratio is correctively enriched, if the catalysts 32, 34 are in the low temperature state (Tcat<= Tcat1) or if the NOx absorptive amount of the lean NOx catalyst 34 is large to some extent (Snox>=S2). Thereby, when the exhaust temperature is increased, then the temperature increase of the catalysts 32, 34 is enhanced, and when the exhaust air/fuel ratio state is enriched then the NOx purge of the lean NOx catalyst 34 is executed.

As a result of this, even if thereafter the engine 1 is shifted to the usual stratified combustion state and the operating state (region (I)) where the in-cylinder air/fuel ratio is extremely lean (between t4 and t5), it is possible to sufficiently absorb NOx in the exhaust gas and reduce the NOx discharge amount to the atmosphere, since the NOx absorptive ability is sufficiently recovered. Further, because the enriching correction of the in-cylinder air/fuel ratio is originally caused to be executed at the fuel recovery timing at which the fuel injection mode is changed and furthermore such as a retard correction of the ignition timing is executed, the driver does not often experience a strange driving sensation even if the output torque of the engine 1 slightly changes.

Following the above, also when the engine 1 returns to the lean operating state at a constant speed (t=t6) after it is again in the fuel cut state (between t5 and t6), if the catalyst 34 is in the low temperature state or in the state where the NOx absorptive amount is large to some extent, the corrective enrichment of the in-cylinder air/fuel ratio as described above is made, then the exhaust purification performance of the catalysts 32, 34 is enhanced.

Herein, if the NOx purge at the recovery timing described above were not made, a change of the NOx absorptive amount in the catalyst 34 would be as shown by a phantom line in the FIG. 7, then it would be in a state where the NOx absorptive amount is large in average, that is, a state of lower NOx absorptive ability, particularly during the period between t4 and t7, compared to the case where the NOx purge at the recovery timing is executed (graph of solid line).

Also if the NOx purge at the recovery timing were not executed, as shown in the FIG. 7, the NOx absorptive amount Snox would reach the first set amount S1 when the engine 1 is in a steady operating condition at a low speed (t=t7), then the compulsory NOx purge would be made, and the combustion state or the in-cylinder air/fuel ratio of the engine 1 would be compulsorily shifted independently of the driver's manipulation in a situation where the output of the engine 1 inherently is not changed, then the driver could not avoid experiencing the strange driving sensation even if a torque variation at this time were small.

Contrary to the above, the fuel control apparatus A of this embodiment, as described above, utilizes the fuel recovery timing when the engine 1 returns from the fuel cut state to the stratified combustion state (region (I)), temporarily enriches the exhaust air/fuel ratio state in the stratified combustion region (I) where the exhaust air/fuel ratio state is originally lean and makes such an enhanced temperature increase of the catalysts 32, 34 and NOx purge, which results in a frequency decrease of compulsory NOx purge in the stratified combustion region (I) thereby achieving improved overall fuel efficiency and improved driving sensation.

Additionally, since such corrective enrichment of the in-cylinder air/fuel ratio is made only when the catalysts 32, 34 are in the low temperature state of the low exhaust purification performance or when the NOx absorptive amount Snox in the lean NOx catalyst 34 is large to some extent, this corrective enrichment at the fuel recovery timing is not often made, also which results in the improved fuel consumption rate.

(Another Embodiment)

Figure 9:
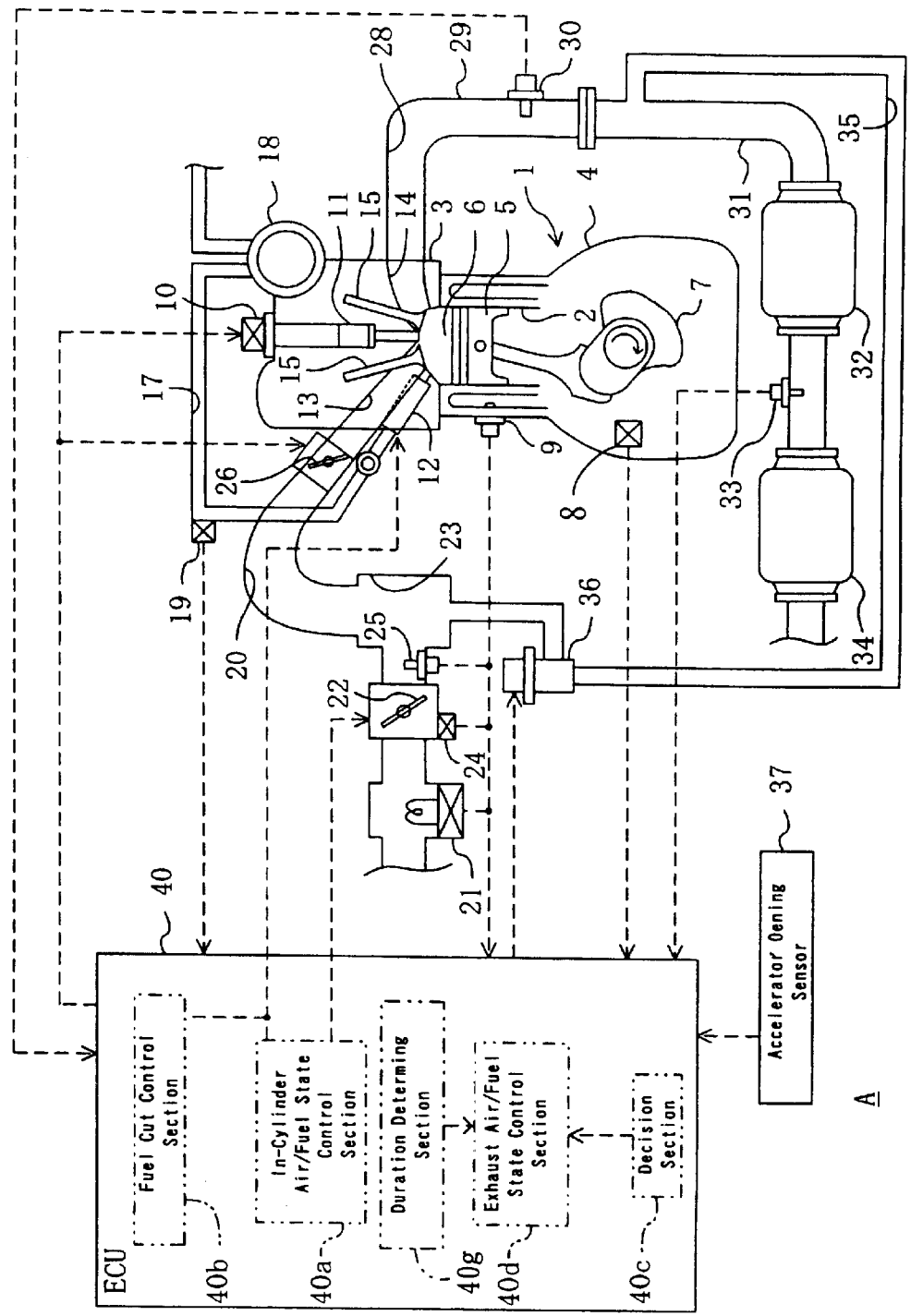
FIG. 9 is an overall configuration diagram of the engine fuel control apparatus according to another embodiment of the present invention.
Figure 10:
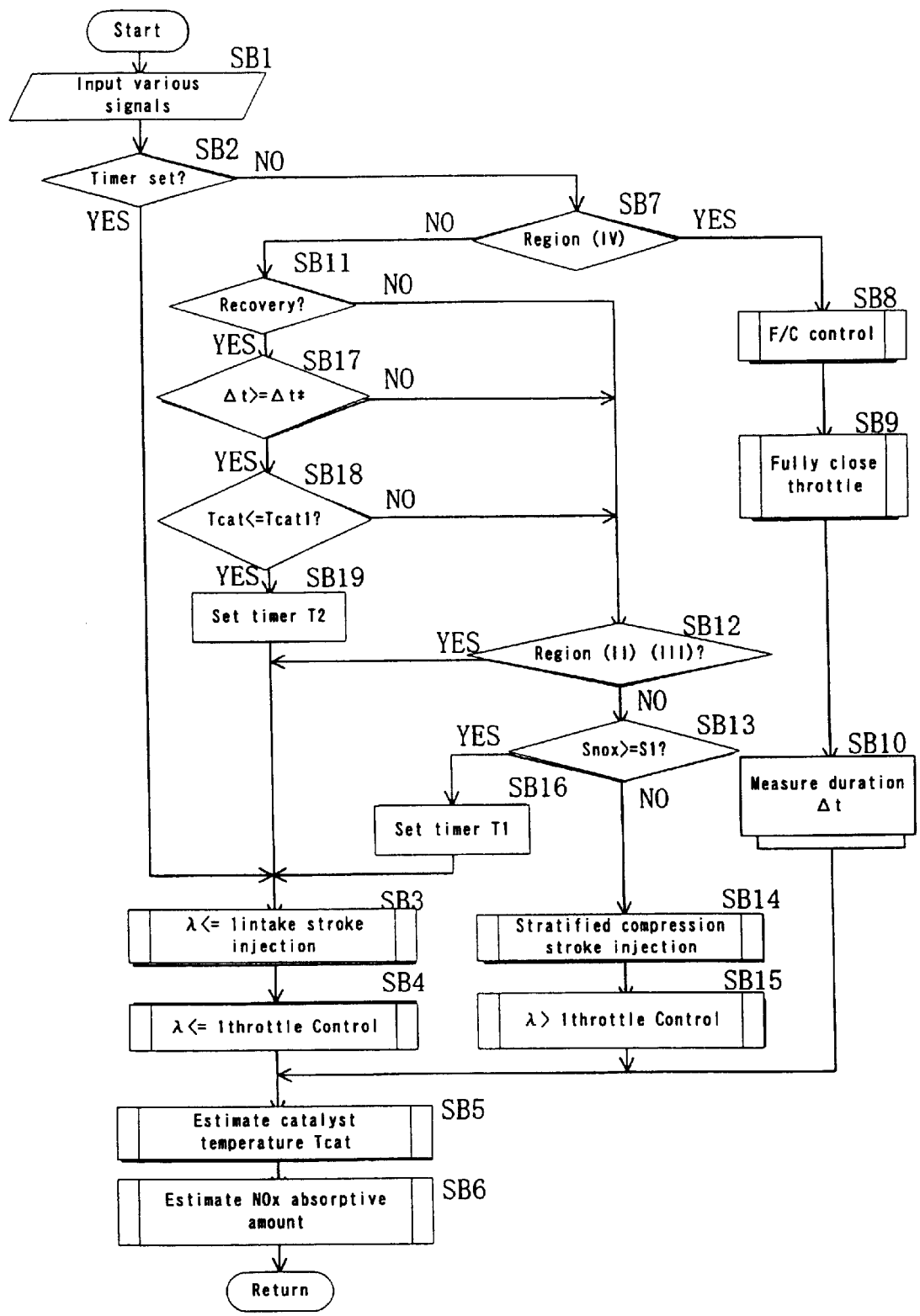
FIG. 10 is a flow chart showing procedure of air/fuel control by an ECU in the another embodiment of the present invention.

FIG. 9 shows an overall configuration of the engine control apparatus according to another embodiment, which corresponds to FIG. 1. In FIG. 9, identical components to those in FIG. 1 are given the same numerical numbers respectively. FIG. 10 is a flow chart showing a procedure or method of air/fuel control by an ECU in the modified embodiment, in which a duration is measured during which the fuel cut control of the engine 1 is executed, and if this duration of the fuel cut control is long, the enrichment of the exhaust air/fuel ratio state is made in principle while utilizing the fuel recovery timing.

Description for an overall configuration of the engine and overview of the engine control in this embodiment is omitted because they are the same as the above-mentioned embodiment. Here, only the air/fuel ratio control process, which differs from that of the embodiment, will be described in detail.

Particularly, at steps SB1 through SB9 of FIG. 10, the same control procedure is executed as at the steps SA1 through SA9 shown in the FIG. 5. Then at the following step SB10, the duration Δt of the fuel cut control is measured by a timer of the ECU 40. Also in a case that NO is determined which is not the recovery from the fuel cut control at a step SB11, at steps SB12 through SB16 the same control procedure is executed as in steps SA11 through SA15.

Further when YES is determined at the step SB11 which is the recovery from the fuel cut control, the process proceeds to a step SB17 and determines whether the duration Δt of the fuel cut control is equal to or more than a predetermined time period Δt*. The process proceeds to step SB12 if this determination is NO, while it proceeds to the step SB18 if the determination is YES, where it determines whether the estimated catalyst temperature Tcat is equal to or lower than a predetermined criterion temperature for the high temperature state Tcat2 (for example 400° C.).

If Tcat>Tcat2 corresponding to NO at the step SA18, and the temperature state of the lean NOx catalyst 34 is very high, then if the exhaust air/fuel ratio state were enriched, the NOx absorptive performance might be deteriorated, so the process proceeds to the step SB12 at this time, while if Tcat<=Tcat2 the process proceeds to the steps SB19 through SB3, SB4 and correctively enriches the in-cylinder air/fuel ratio as at the steps SA3, SA4.

That is, the longer duration of the fuel cut control, the more catalysts 32, 34 will be cooled and a larger the air flow through the catalysts 32, 34 due to a higher engine rotational speed N at the start time of the fuel cut control, consequently at this time the fuel cut control cools the catalysts 32, 34 and the temperature state of the catalysts 32, 34 becomes very low.

Therefore, in this modified embodiment, the duration of the fuel cut control is measured, if this time Δt is more than the set time Δt*, the exhaust air/fuel ratio state is enriched utilizing the fuel recovery timing, whereby the temperature state of the catalysts 32, 34 is elevated while reducing the strange driving sensation and a deterioration of the exhaust purification performance is prevented. At that time, the air/fuel ratio is controlled between stoichiometric air/fuel ratio and an air fuel ratio of 12 because if the air/fuel ratio exceeds 12, temperature of the catalyst falls owing to a greater amount of unburned fuel contained in the exhaust gas.

If the duration Δt of the fuel cut control is long, in such a case that the catalysts 32, 34 is likely to be overheated at the starting timing of the fuel cut control, the enrichment of the air/fuel ratio is not made since the catalysts 32, 34 are not in the low temperature state where the purification performance is deteriorated at the end timing of the fuel cut control.

A duration determining section 40g which determines whether the duration Δt of the fuel cut control of the engine 1 is equal to or greater than the set duration Δt* is constituted with the step SB17 illustrated in the FIG. 10.

And in this modified embodiment, the exhaust air/fuel ratio control section 40d is configured to correctively enrich the in-cylinder air/fuel ratio when the fuel cut control is terminated and the engine 1 shifts to the stratified combustion region (I) if the duration determining section 40g has determined that the fuel cut control duration Δt is equal to or more than the set duration Δt*.

(Other Embodiments)

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

For instance, while in the aforementioned embodiments the in-cylinder air/fuel ratio of the engine 1 is controlled to be the stoichiometric air/fuel ratio (A/F=14.7) in order to enrich the exhaust air/fuel state, the present invention is not limited to this, the in-cylinder air/fuel ratio may be controlled to be richer than the stoichiometric air/fuel ratio (for example A/F=12–14).

Also when the exhaust air/fuel state is enriched, the injector 12 may be made to additionally inject fuel during the expansion stroke or the exhaust stroke. By doing so, the exhaust air/fuel state can be certainly enriched while the output torque variation of the engine 1 can be maintained at a minimum, and further the temperature state of the catalyst 34 can be very effectively increased since the fuel is additionally injected during the expansion stroke or so, a part of which may burn at a later timing or react with oxygen in the exhaust gas within the exhaust passage 28.

Also in the case that the additional fuel injection is made e.g. during the expansion stroke, when the engine rotational speed N decreases to a rotational speed higher than the recovery rotational speed N1, preferably, the fuel cut control is maintained while the throttle valve 22 is operatively opened.

By doing so, when the engine rotational speed N decreases to the recovery rotational speed N1, that is, when the fuel cut control terminates and the engine 1 is in the idle operating state, the intake air flow into the combustion chamber 6 can be sufficiently increased and the temperature state can be rapidly increased by supplying a large amount of the exhaust gas to the catalysts 32, 34. Also simultaneously, HC and CO supply amount to the lean NOx catalyst 34 can be sufficiently increased, whereby the NOx purge can be very effectively carried out. These controls may be made only in case of the higher temperature state of the catalysts 32, 34.

Also, in the aforementioned embodiment, in an upstream side of the exhaust passage 28 of the engine 1 the three-way catalyst 32 is disposed and in a downstream side of that the lean NOx catalyst 34 is disposed, however, the present invention not limited to this configuration. The lean NOx catalyst may be disposed in the upstream side and the three-way catalyst may be disposed downstream of that. Or only the lean NOx catalyst 34 may be disposed therein. Also, the lean NOx catalyst 34 is not limited to the NOx absorptive and reducing type, but it may be any of the NOx absorptive type having a NOx absorbent.

Also in the aforementioned embodiment the fuel control apparatus is applied to the spark-ignited direct injection engine 1, however, the present invention is not limited to this type of engine. That is, the present invention can be applied to the spark-ignited engine of a so called port injection type where the injector is disposed so as to inject fuel to the intake port and also it can be applied to a diesel engine. Further these engines can be combined with electric driving motors and a so called hybrid type of powertrain can be formed.

As explained above, in the engine having a lean operating region where the exhaust temperature state becomes relatively low and the fuel cut control made under the predetermined condition, particularly considering the catalyst being cooled during the fuel cut control, when the engine shifts to the lean operating region, if the catalyst is in the low temperature state with the lower performance, the recovery timing for resuming the fuel supply is utilized and the exhaust air/fuel state enriched so that the deterioration of the exhaust purification performance can be prevented by increasing the catalyst temperature state while reducing any strange driving sensation.

Further, in the engine having a lean operating region where the exhaust gas is the excess oxygen atmosphere and the fuel cut control made under the predetermined condition, considering that the NOx absorbent disposed in the exhaust passage has the lower absorptive ability as the increased NOx absorptive amount, when the engine shifts to the lean operating region, if the catalyst has absorbed the predetermined amount of NOx or more, the recovery timing for resuming the fuel supply is utilized and the exhaust air/fuel state is enriched so that the deterioration of the exhaust purification performance can be prevented by releasing NOx from the NOx absorbent and reducingly purifying it while reducing any strange driving sensation.

Moreover, when the engine shifts from the fuel cut control to the lean operating region, the exhaust air/fuel state can be enriched by correctively enriching the in-cylinder air/fuel ratio. Also, at this time, the torque variation can be suppressed by regulating the opening operation of the throttle valve and maintaining its opening at the relatively small state.

Furthermore, the fall of the catalyst temperature state is suppressed by closing the throttle valve during the execution of the fuel cut control, and when the fuel cut control is terminated and the fuel injection supply is resumed, the sufficient intake air flow is obtained and the additional fuel injection such as during the expansion stroke of the cylinder is made, so that the torque variation can be suppressed enough while the temperature state of the catalyst can be rapidly increased by supplying a large amount of high temperature exhaust gas.

Finally, when the duration of the fuel cut control becomes equal to or more than the set duration, the exhaust air/fuel state is enriched utilizing the timing when this fuel cut control is terminated and the fuel recovery is made, so that even if the catalyst temperature state decreases during the fuel cut control, utilizing the fuel recovery timing the catalyst temperature state can be rapidly recovered, that is, it can be increased to the active temperature state.

We claim:

1. Fuel control apparatus for an engine equipped with a catalyst which performs a three-way purification function at least when an air/fuel state of exhaust gas is in a state corresponding to a substantially stoichiometric air/fuel ratio, said fuel control apparatus comprising:

a combustion state control means which operates the engine in either a stratified combustion state or a homogeneous combustion state based upon an operating condition of the engine, said stratified combustion state being executed when the engine is in a predetermined region of low rotational speed and low load side and said homogeneous combustion state being executed when the engine is in another predetermined region of high rotational speed and high load side;

an in-cylinder air/fuel control means which controls an in-cylinder air/fuel ratio that is an average air fuel ratio prior to an ignition in an in-cylinder combustion chamber to be lean of the stoichiometric air/fuel ratio when the engine is in said stratified combustion state, said in-cylinder air/fuel control means also controlling an in-cylinder air/fuel ratio that is an average air fuel ratio prior to an ignition in an in-cylinder combustion chamber to be the substantially stoichiometric air/fuel ratio or slightly richer;

a fuel cut control means which performs a fuel cut control of compulsorily stopping a fuel supply to the combustion chamber under a predetermined condition during a decelerating operation of the engine;

a fuel cut control terminate means which resumes said fuel supply when said fuel cut control is executed and when an accelerator pedal is stepped on, or when the engine rotational speed becomes equal to a predetermined recovery rotational speed;

a low catalyst temperature determining means for determining whether the catalyst is in a predetermined low temperature state where its exhaust purification performance is deteriorated; and an exhaust air/fuel ratio control means for controlling the exhaust air/fuel state to be within a range between a substantially stoichiometric air/fuel ratio and an air/fuel ratio of 12 regardless of the operating condition of the engine when said low catalyst temperature determining means determines that the catalyst is in said predetermined low temperature state and when said fuel cut control by said fuel cut control means is terminated by said fuel cut control terminate means;

wherein the engine is further equipped with a fuel injector for injecting fuel directly into the in-cylinder combustion chamber and a throttle valve for controlling an intake air amount of the engine, said exhaust air/fuel ratio control means causing the fuel injector to additionally inject fuel during a cylinder expansion stroke or a cylinder exhaust stroke so that the exhaust air/fuel ratio is in a state corresponding to a state within a range between substantially stoichiometric air/fuel ratio and 12 of an air/fuel ratio, said fuel control apparatus further comprising:

a throttle opening control means for closing the throttle valve when said fuel cut control is performed by said fuel cut control means and when the engine rotational speed is higher than a specific rotational speed which is higher than said predetermined recovery speed and causing the throttle valve to operate to open even if said fuel cut control is performed when the engine rotational speed decreases to said set rotational speed if the catalyst is determined to be in the low temperature state by said low catalyst temperature determining means.

2. Fuel control apparatus for an engine equipped with a catalyst which performs a three-way purification function at least when an air/fuel state of exhaust gas is in a state corresponding to a substantially stoichiometric air/fuel ratio, said fuel control apparatus comprising:

a crank angle sensor for detecting a rotational angle;

an airflow sensor for detecting an intake air amount inducted into the engine;

a throttle opening sensor for detecting an opening of a throttle valve which is not mechanically connected to an accelerator pedal;

an accelerator opening sensor;

a water temperature sensor positioned so as to face a water jacket of the cylinder block of the engine; and a control unit for controlling an ignition circuit, an injector and a motor of the throttle valve based upon output signals received from said crank angle sensor, said airflow sensor, said throttle opening sensor, said accelerator opening sensor and said water temperature sensor, wherein said control unit operates the engine either in a stratified combustion state or a homogeneous combustion state based upon an operating condition of the engine, said stratified combustion state being executed when the engine is in a predetermined region of low rotational speed and low load side and said homogeneous combustion state being executed when the engine is in another predetermined region of high rotational speed and high load side, wherein said control unit controls an in-cylinder air/fuel ratio that is an average air fuel ratio prior to an ignition in an in-cylinder combustion chamber to be lean of the stoichiometric air/fuel ratio when the engine is in said stratified combustion state and controls an in-cylinder air/fuel ratio that is an average air fuel ratio prior to an ignition in an in-cylinder combustion chamber to be the substantially stoichiometric air/fuel ratio or slightly richer, wherein said control unit performs a fuel cut control which compulsorily stops a fuel supply to the combustion chamber under a predetermined condition during a decelerating operation of the engine, wherein said control unit resumes the fuel supply when said fuel cut control is executed and when an accelerator pedal is stepped on, or when the engine rotational speed becomes equal to a predetermined recovery rotational speed, wherein said control unit determines whether the catalyst is in a predetermined low temperature state whereby the catalysts exhaust purification performance is deteriorated, wherein said control unit controls the exhaust air/fuel state to be within a range between the substantially stoichiometric air/fuel ratio and an air/fuel ratio of 12 regardless of the operating condition of the engine when the catalyst is in the low temperature state and when said fuel cut control is terminated, wherein said control unit causes the fuel injector to inject additional fuel during a cylinder expansion stroke or a cylinder exhaust stroke so that the exhaust air/fuel ratio is in a state corresponding to a state within a range between the substantially stoichiometric air/fuel ratio and 12 of the air/fuel ratio when the catalyst is in the low temperature state and when said fuel cut control is terminated, wherein said control unit closes the throttle valve when said fuel cut control is performed and when the engine rotational speed is higher than a specific rotational speed which is higher than said predetermined recovery speed, wherein said control unit causes the throttle valve to open when said fuel cut control is performed and when the engine rotational speed decreases to said specific rotational speed if the catalyst is determined to be in the low temperature state.

3. Fuel control apparatus for an engine equipped with a catalyst which performs a three-way purification function at least when an air/fuel state of exhaust gas is in a state corresponding to a substantially stoichiometric air/fuel ratio, said fuel control apparatus comprising:

a combustion state control means which operates the engine in either a stratified combustion state or a homogeneous combustion state based upon an operating condition of the engine, said stratified combustion state being executed when the engine is in a predetermined region of low rotational speed and low load side and said homogeneous combustion state being executed when the engine is in another predetermined region of high rotational speed and high load side;

an in-cylinder air/fuel control means which controls an in-cylinder air/fuel ratio that is an average air fuel ratio prior to an ignition in an in-cylinder combustion chamber to be lean of the stoichiometric air/fuel ratio when the engine is in said stratified combustion state, said in-cylinder air/fuel control means also controlling an in-cylinder air/fuel ratio that is an average air fuel ratio prior to an ignition in an in-cylinder combustion chamber to be the substantially stoichiometric air/fuel ratio or slightly richer;

a fuel cut control means which performs a fuel cut control of compulsorily stopping a fuel supply to the combustion chamber under a predetermined condition during a decelerating operation of the engine;

a fuel cut control terminate means which resumes said fuel supply when said fuel cut control is executed and when an accelerator pedal is stepped on, or when the engine rotational speed becomes equal to a predetermined recovery rotational speed;

a low catalyst temperature determining means for determining whether the catalyst is in a predetermined low temperature state where its exhaust purification performance is deteriorated; and an exhaust air/fuel ratio control means for controlling the exhaust air/fuel state to be within a range between a substantially stoichiometric air/fuel ratio and an air/fuel ratio of 12 regardless of the operating condition of the engine when said low catalyst temperature determining means determines that the catalyst is in said predetermined low temperature state and when said fuel cut control by said fuel cut control means is terminated by said fuel cut control terminate means;

wherein the engine is further equipped with a throttle valve for controlling an intake air amount into the in-cylinder combustion chamber of the engine, and said exhaust gas air/fuel ratio control means correctively controls the in-cylinder air/fuel ratio to be within a range between a substantially stoichiometric air/fuel ratio and an air/fuel ratio of 12, said fuel control apparatus further comprising:

a throttle opening control means for controlling an opening of the throttle valve according to an accelerator manipulative amount and an engine operating condition so as to achieve a required torque characteristic, said throttle opening control means also controlling opening of the throttle valve to open the relative positions in order to reduce a pumping loss when the engine is set in said stratified combustion state and closing of the throttle valve during the execution of said fuel cut control by said fuel cut control means; and a throttle opening operation regulating means for regulating the control of the throttle valve opening operation to open the relative positions in order to reduce said pumping loss by said throttle opening control means if the accelerator manipulative amount is zero when the corrective control of the in-cylinder air fuel ratio by said exhaust air/fuel ratio control means is executed.

4. Fuel control apparatus for an engine equipped with a catalyst which performs a three-way purification function at least when an air/fuel state of exhaust gas is in a state corresponding to a substantially stoichiometric air/fuel ratio, said fuel control apparatus comprising:

a crank angle sensor for detecting a rotational angle;

an airflow sensor for detecting an intake air amount inducted into the engine;

a throttle opening sensor for detecting an opening of a throttle valve which is not mechanically connected to an accelerator pedal;

an accelerator opening sensor;

a water temperature sensor positioned so as to face a water jacket of the cylinder block of the engine; and a control unit for controlling an ignition circuit, an injector and a motor of the throttle valve based upon output signals received from said crank angle sensor, said airflow sensor, said throttle opening sensor, said accelerator opening sensor and said water temperature sensor, wherein said control unit operates the engine either in a stratified combustion state or a homogeneous combustion state based upon an operating condition of the engine, said stratified combustion state being executed when the engine is in a predetermined region of low rotational speed and low load side and said homogeneous combustion state being executed when the engine is in another predetermined region of high rotational speed and high load side, wherein said control unit controls an in-cylinder air/fuel ratio that is an average air fuel ratio prior to an ignition in an in-cylinder combustion chamber to be lean of the stoichiometric air/fuel ratio when the engine is in said stratified combustion state and controls an in-cylinder air/fuel ratio that is an average air fuel ratio prior to an ignition in an in-cylinder combustion chamber to be the substantially stoichiometric air/fuel ratio or slightly richer, wherein said control unit performs a fuel cut control which compulsorily stops a fuel supply to the combustion chamber under a predetermined condition during a decelerating operation of the engine, wherein said control unit resumes the fuel supply when said fuel cut control is executed and when an accelerator pedal is stepped on, or when the engine rotational speed becomes equal to a predetermined recovery rotational speed, wherein said control unit determines whether the catalyst is in a predetermined low temperature state whereby the catalysts exhaust purification performance is deteriorated, wherein said control unit controls the exhaust air/fuel state to be within a range between the substantially stoichiometric air/fuel ratio and an air/fuel ratio of 12 regardless of the operating condition of the engine when the catalyst is in the low temperature state and when said fuel cut control is terminated, wherein said control unit controls the in-cylinder air/fuel ratio to be within a range between the substantially stoichiometric air/fuel ratio and an air/fuel ratio of 12 so as to control the exhaust air/fuel state to be within a range between the substantially stoichiometric air/fuel ratio and an air/fuel ratio of 12 when the catalyst is in the low temperature state and when said fuel cut control is terminated, wherein said control unit controls an opening of the throttle valve according to an accelerator manipulative amount and an engine operating condition so as to achieve a required torque characteristic, controls an opening of the throttle valve to open the relative positions in order to reduce a pumping loss when the engine is set in said stratified combustion state, and controls a closing of the throttle valve during the execution of said fuel cut control, and wherein said control unit regulates control of the throttle valve opening operation to open the relative positions in order to reduce the pumping loss by said throttle opening control means if the accelerator manipulative amount is zero when a corrective control of the in-cylinder air fuel ratio by said exhaust air/fuel ratio control means is executed.

* * * * *